US012434120B1

(12) United States Patent
Benton et al.

(10) Patent No.: US 12,434,120 B1
(45) Date of Patent: Oct. 7, 2025

(54) ATHLETIC EQUIPMENT SHAFT PROTECTIVE HEAT-SHRINK SHEATH

(71) Applicant: Caddy Wrap LLC, Prairie Village, KS (US)

(72) Inventors: Adam Benton, Prairie Village, KS (US); Bradley Benton, Springfield, MO (US); Cory Fisher, Mission Hills, KS (US)

(73) Assignee: Caddy Wrap LLC, Prairie Village, KS (US)

( * ) Notice: Subject to any disclaimer, the term of this patent is extended or adjusted under 35 U.S.C. 154(b) by 0 days.

(21) Appl. No.: 19/172,025

(22) Filed: Apr. 7, 2025

Related U.S. Application Data

(60) Provisional application No. 63/631,321, filed on Apr. 8, 2024.

(51) Int. Cl.
*A63B 60/64* (2015.01)
*B01L 7/02* (2006.01)

(52) U.S. Cl.
CPC ................ *A63B 60/64* (2015.10); *B01L 7/02* (2013.01); *B01L 2300/1844* (2013.01)

(58) Field of Classification Search
CPC .... A63B 60/64; B01L 7/02; B01L 2300/1844
See application file for complete search history.

(56) References Cited

U.S. PATENT DOCUMENTS 4,016,640 A 4/1977 Briggs
5,962,368 A 10/1999 Poole
6,139,451 A 10/2000 Hillerich, III et al.
6,775,891 B1 8/2004 Tsiguloff
D549,794 S 8/2007 Hansen
8,226,789 B1 7/2012 Glaser
9,254,612 B2 2/2016 Bahr et al.
2002/0101001 A1 8/2002 Anderson
(Continued)

FOREIGN PATENT DOCUMENTS

AU 2004100054 A4 * 2/2004
AU 2017272263 A1 6/2019
(Continued)

OTHER PUBLICATIONS

Notice of Allowance received for U.S. Appl. No. 19/172,356, mailed on Jul. 7, 2025, 8 pages.
(Continued)

*Primary Examiner* — Jeffrey S Vanderveen
(74) *Attorney, Agent, or Firm* — SHOOK, HARDY & BACON L.L.P.

(57) ABSTRACT

A sheath for protecting an athletic equipment shaft is formed from a heat shrink material. The sheath is contemplated as capable of having a directional shrink in the transverse direction greater than 50% allowing the sheath to pass over additional components on the shaft, such as a golf club grip, while still being able to constrict down to effectively compress and secure to the shaft. The sleeve is formed from a material that allows for the inspection of the underlying shaft and allows for a printed indicia on an interior surface, wherein the printed indicia is also protected, to be visible through the sleeve. A longitudinal perforation is also contemplated in an example to aid in the removal of the sleeve without damaging the underlying shaft.

20 Claims, 14 Drawing Sheets

(56) References Cited

U.S. PATENT DOCUMENTS

| | | | | |
|---|---|---|---|---|
| 2007/0240799 | A1 | 10/2007 | Hansen | |
| 2009/0124409 | A1 | 5/2009 | Greeves | |
| 2009/0305810 | A1 * | 12/2009 | Kim | A63B 60/00 473/319 |
| 2015/0080145 | A1 | 3/2015 | Roller et al. | |
| 2021/0295744 | A1 | 9/2021 | Ray | |
| 2022/0023726 | A1 | 1/2022 | Yamamoto | |

FOREIGN PATENT DOCUMENTS

| | | | | | |
|---|---|---|---|---|---|
| CN | 201220480 | Y | | 4/2009 | |
| CN | 201261261 | Y | | 6/2009 | |
| CN | 103722643 | A | | 4/2014 | |
| CN | 205150423 | U | | 4/2016 | |
| CN | 205522468 | U | | 8/2016 | |
| CN | 210259084 | U | | 4/2020 | |
| CN | 114523660 | A | | 5/2022 | |
| CN | 216732606 | U | | 6/2022 | |
| CN | 115957491 | A | * | 4/2023 | |
| GB | 2323296 | A | | 9/1998 | |
| SU | 1736728 | A1 | | 5/1992 | |
| WO | 91/10355 | A2 | | 7/1991 | |
| WO | WO-2008026866 | A1 | * | 3/2008 | A63B 53/10 |
| WO | 2019084626 | A1 | | 5/2019 | |
| WO | 2019109149 | A1 | | 6/2019 | |

OTHER PUBLICATIONS

International Search Report and Written Opinion received for PCT Patent Application No. PCT/US2025/023475, mailed on Jun. 24, 2025, 10 pages.

Invitation to Pay Additional Fees received for PCT Patent Application No. PCT/US2025/023487, mailed on Jul. 7, 2025, 12 pages.

* cited by examiner

ATHLETIC EQUIPMENT SHAFT PROTECTIVE HEAT-SHRINK SHEATH

CROSS REFERENCE TO RELATED APPLICATIONS

This application claims the benefit of U.S. Provisional Application No. 63/631,321 filed on Apr. 8, 2024, which is incorporated herein by reference in its entirety.

This application is related by subject matter to U.S. Nonprovisional application Ser. No. 19/172,356 filed on the same date of Apr. 7, 2025, and titled ATHLETIC EQUIPMENT HEAT-SHRINK SHEATH THERMAL CHAMBER, which is incorporated herein by reference in its entirety.

TECHNICAL FIELD

The present disclosure is directed to a protective sheath formed from a heat-shrinkable material. The protective sheath is applied to an athletic shaft, such as a golf club shaft.

BACKGROUND

Athletic equipment components, such as a golf club shaft, are generally formed from materials providing a specific functional benefit associated with the goal of the athletic equipment. The functional benefit may be associated with a desired result to be achieved by the athletic equipment. For example, a golf club shaft may be formed from a graphite composition that is beneficial in enhancing a drive distance for a struck golf ball. Unfortunately, a material selected for the benefit of the athletic results to be achieved, such as a longer drive with a golf club having a graphite shaft, may not provide superior wear resistance, scratch resistance, or even aesthetics within the environment intended for their use.

DETAILED DESCRIPTION OF DRAWINGS

Subject matter of the present disclosure associated with an athletic equipment protective sheath is described in detail below with reference to these figures.

DETAILED DESCRIPTION

Figure 1:
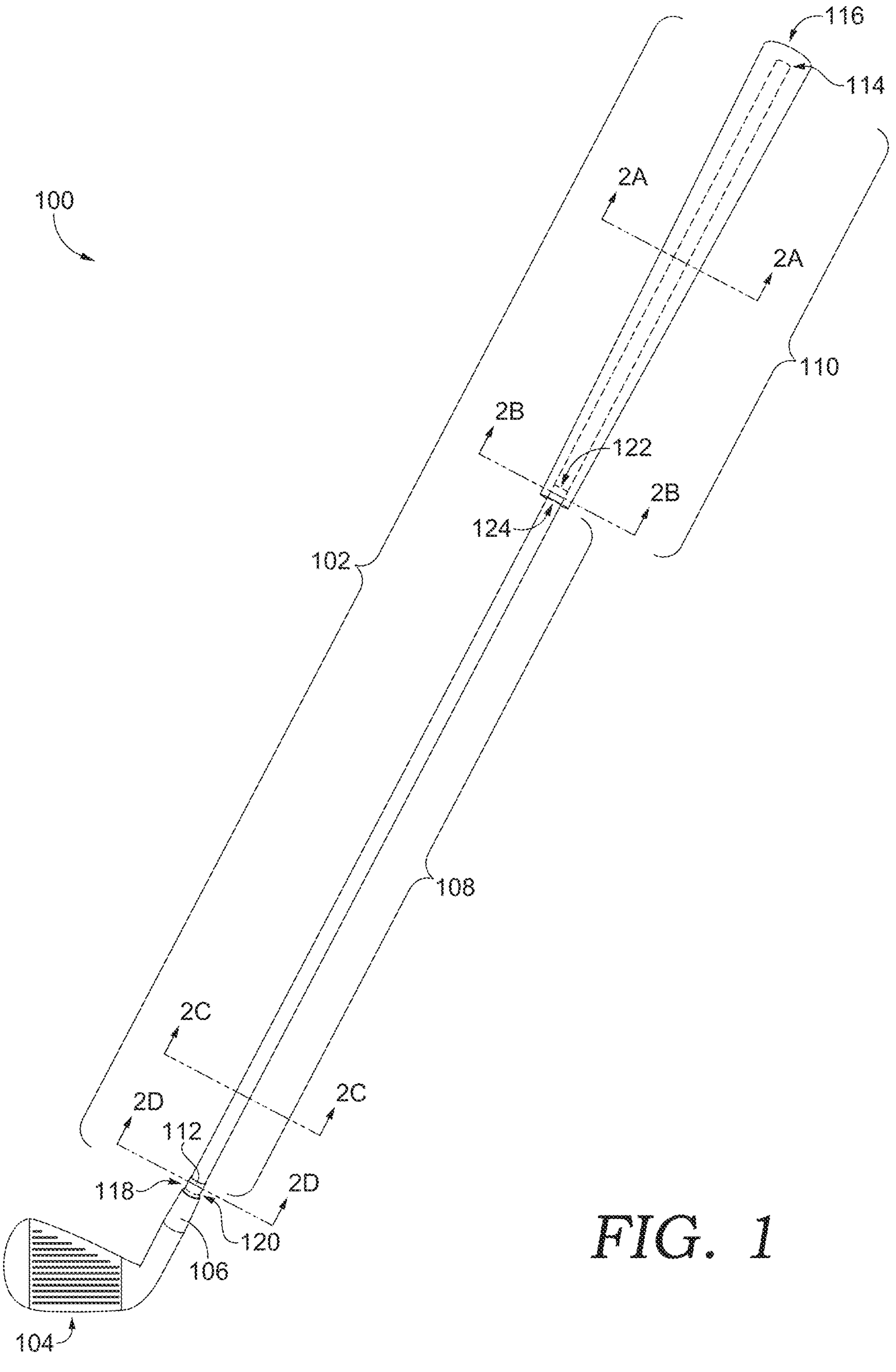
FIG. 1 depicts a golf club having a heat-shrink protective sheath on the shaft of the golf club, in accordance with aspects hereof.

This detailed description is related to a heat-shrink sheath for an athletic equipment shaft, such as a golf club shaft. The sheath, also considered a sleeve or tube, provides a replaceable protective covering to the athletic equipment shaft and the sheath is effective to provide a removable aesthetic to the athletic equipment shaft. The sheath is capable of being applied to the shaft without removing, in some examples, other components of the athletic equipment. For example, the sheath may be sized to pass over a golf club grip that is already overlaying a golf club shaft. The sheath is to be positioned on the golf club shaft between a golf club head and a portion of the grip and then the sheath is heated to shrink to a smaller circumference than the grip's outside circumference allowing the sheath to conform with a taper of the golf club shaft. Forming the sheath from a heat shrink material that is effective to shrink substantially in a transverse direction with minimal contraction in a longitudinal direction allows for the sheath to be installed with minimal disruption to the athletic equipment while achieving a conformed fit with the athletic equipment shaft.

The sheath contemplated herein in an example is maintained in a position on the shaft through compression caused from a reaction by the sheath material in response to exposure with thermal energy, such as dry hot air. In an example, the sheath is not maintained on the shaft with an adhesive bonding the sheath to the shaft. The absence of adhesive between the sheath and the shaft prevents unwanted residual adhesive remaining on the shaft if the sheath is removed. Further, omitting adhesive as a bonding agent between the sheath and the shaft prevents the adhesive from disrupting or interfering with an external perception of a printed indicia on an inside surface of a transparent sheath. Stated differently, if adhesive was included to bond the sheath to the shaft, the adhesive may obscure one or more indicia printed on an interior surface of the sheath from being perceived as intended on the exterior of the sheath. Additionally, the reliance on compression instead of adhesive to maintain the sheath on the shaft reduces the weight of the sheath and limits the introduced variability to the performance of the shaft.

The sheath contemplated herein in an example is formed from a sheet (e.g., a film) that overlaps itself forming an envelope or tubular structure. The overlapped portions of the sheet are bonded together, such as through a solvent weld, forming a seam in a longitudinal (e.g., the length) direction of the sheath. A non-limiting list of solvents effective for forming a welded joint include ethyl acetate, methyl ethyl ketone (MEK), and dichloromethane (DCM), as examples. A solvent useable for a solvent weld may be referred to as a seaming solvent in the industry. The longitudinal seam that is a solvent weld provides several advantages, discussed below, related to a heat-shrink structure for protecting an athletic equipment shaft. Alternatively, to solvent seaming, the joint may be formed with hot-bar (heat-sealing), laser-welding, or ultrasonic radiation A first advantage of a longitudinal joint (e.g., a seam), such as a solvent longitudinal weld, relates to a heat shrink material forming the sheath. It is desired to have a substantially uniform appearance proximate a joint following a shrinking operation to provide uniform appearance, uniform performance, and reduce distractions caused by lack of uniformity in the perception of a user of the shaft that is covered by the sheath. Utilizing a solvent bond to weld the overlap in the longitudinal direction allows a substantially uniform shrinkage of the material at the weld and away from the weld. This is in contrast to an adhesive (e.g., glue) bonded seam that relies on a bonding agent that interfaces between the overlapped sheet material. The bonding agent may not shrink consistently with the sheet material causing bulky seams, bumps, ripples, and other discontinuities in the sheath along the length and around the shaft. In alternative examples an adhesive seam is used and is effective.

Secondly, the longitudinal seam is in contrast to a winding of a tape strip that forms a helical or transverse seam along the shaft. A longitudinal seam provides a uniform alteration to the shaft along the length to minimally change the performance of the shaft. In contrast, a helical seam provides radial variability along the length of the shaft and as a result may introduce torsion variability, flex variability, and other variations to the performance of the shaft. Similarly, a tape strip that is applied radially around a shaft in a rotational manner may have a transverse seam or a helical seam that introduce variability in overlap of layers of the wrapping material along the length of the shaft. This non-uniform distribution and overlap of material at different radial locations and positions along the length can introduce variability to the performance of the shaft. Further, an adhesive wrapped film provides variability in the amount of overlap along the longitudinal length of the shaft, especially for a tapered shaft. This variability introduces non-uniform functional alterations to the shaft that may not be intended by a user, such as a golfer.

The sheath, in an example, is formed having a substantially uniform inside circumference along the length of the sheath prior to heat shrinking. Stated differently, the width of the sheet material formed into the sheath (e.g., envelope, cylinder, tube, sleeve) is uniform along the length of the sheath allowing for a continuous length of a sheath to be cut to any length depending on the specific longitudinal length of the shaft to receive the sheath. This reduces waste and increases compatibility of the contemplated sheath in contrast to a material having a taper or variability in width/ circumference along a length of the sheath material.

The sheath, in an example contemplated herein, is formed having a perforation along a portion or all of the longitudinal length. The longitudinal perforation is beneficial in the removal of the sheath from the shaft after application. As will be discussed herein, the material forming the sheet material that is used to form the sheath is contemplated as having relatively high shrinkability in the transverse direction (e.g., around the shaft) and having relatively minimal shrinkability in the longitudinal direction (e.g., the length of the shaft). Having directional shrinkability in the material results in enhanced tear resistance across the direction of shrinkability. Because the shrinkability is in the transverse direction, it is more difficult to tear the sheath in the longitudinal direction (e.g., difficult to tear across the polymeric chains oriented in the transverse direction) as compared to tearing in the transverse direction that is between the polymeric chains parallel to the tear direction. Inclusion of a longitudinal perforation facilitates tearing the sheath along the longitudinal direction even with the enhanced resistance of tearing creating by the desired transverse shrinkability. Stated differently, the sheath is formed to have a high shrinkability in the transverse direction, which makes ripping the sheath in the longitudinal direction difficult, but the inclusion of the longitudinal perforation overcomes the enhanced resistance to ripping/tearing of the sheath along the length of the shaft.

The sheath contemplated herein in an example is formed from a transparent or substantially transparent material allowing for visibility of the underlying shaft and/or a printed layer on an inner surface of the sheath to be visible through the sheath. The transparency will be discussed herein in relation to a haze percentage, but for purposes of the present discussion, the transparency of the sheath allows for inspection of the underlying shaft for faults, failures, or conformance with standards of the event in which the athletic equipment is being used. This is not achieved with a minimally transparent material. Further, as a benefit of the sheath is to provide a protective covering to a shaft, it is also desired in some situations to enhance the aesthetic or cosmetics of the shaft. Aspects contemplate printing one or more indicia on an interior surface of the sheath, such as in a mirrored manner allowing the printed indicia to be visible though the sheath and change the appearance of the shaft through the printed indicia. The printing is on an interior surface of the sheath, in an example, to allow the sheath to not only protect the shaft, but to also protect the printed indicia. This is to the contrary of printing on an exterior surface that would expose the printed indicia to the same forces (e.g., impacts, strikes, scuffs, rubbing) for which the underlying shaft is being protected from by the sheath. That said, in an example the printed indicia may be on an exterior of the sheath.

While many examples provided in connection with the sheath relate to a golf club and the associated golf club shaft, the sheath is contemplated as being applicable to other shafts, such as other athletic equipment shafts. Non-limiting examples of athletic equipment shafts includes poles (e.g., ski poles, tracking poles, fishing poles, pole vault poles, golf hole flag poles (i.e., a stick or pin extending from a golf hole)), bats (e.g., baseball bats, softball bats, cricket bats), racquets (e.g., tennis racquets, pickle ball racquets, table tennis paddles), sticks (e.g., lacrosse stick, hockey stick, field hockey stick), archery arrows, pool cues, dumbbells, barbells, and the like. Other shafts contemplated that benefit from the use of a heat-shrink sheath includes tent poles/legs, furniture legs/features, and the like.

Referring to FIG. 1 that depicts a golf club 100 having a heat-shrink protective sheath, sheath 108, on a shaft 102 of the golf club 100. The golf club 100 is comprised of a grip 110, the shaft 102, the sheath 108, a ferrule 106, and a head 104. The shaft 102, the grip 110, the ferrule 106 and the head 104 are all well known in the art and will not be described herein. The golf club 100 represents all types of golf clubs including drivers, hybrids, woods, irons, wedges, and putters.

The shaft 102 may be formed from any material. In an example the shaft 102 is formed from a material traditionally used for a golf club shaft. Examples of materials used to form a golf club shaft include graphite, metal (e.g., steel, titanium), or a combination thereof as a hybrid. Regardless of the material used to form a golf club shaft, the shaft traditionally has a tapered cross section along a longitudinal length of the shaft. The shaft 102 has a shaft grip end 114 on a first end of the longitudinal length and a shaft head end 118 on an opposite second end of the longitudinal length. A diameter of the shaft 102 is generally greater proximate the shaft grip end 114 relative to a diameter of the shaft 102 proximate the shaft head end 118. This tapered width creates a tapered circumference along the longitudinal length. The tapered shaft presents challenges for the sheath 108 as different amount of shrink are required to occur from a consistently sized (pre-shrink) sheath (e.g., consistent circumference or envelope width). This non uniform shrink necessitates a material having sufficient shrinkability to accommodate the variable cross sections of a tapered shaft.

The grip 110 has a grip distal end 116 proximate the shaft grip end 114 and a grip shaft end 124 opposite the grip distal end 116. The grip shaft end 124 overlap, in an example, the sheath 108 forming a clean transition between the grip 110 and the sheath 108 over the shaft 102. This overlap limits exposed shaft between the sheath and the grip providing a uniform surface and continuous surface protection.

The sheath 108 has a sheath grip end 122 and an opposite sheath head end 120. The sheath grip end 122 is more proximate the shaft grip end 114 and the sheath head end 120 is more proximate the shaft head end 118. The sheath grip end 122, in an example is overlapped by a portion of the grip 110 such that the sheath grip end 122 is more proximate the shaft grip end 14 than the grip shaft end 124. The term sheath used herein represents a sleeve, tube, cylinder, envelope, or other structure effective to surround a shaft and having an open first end and an open second end with a continuous transverse surface, such as through seaming that joins to sides along a longitudinal length.

The golf club 100 includes a termination tape 112. While depicted in FIG. 1, the termination tape 112 is optional and may be omitted in some examples. The termination tape 112 may be omitted in examples where the sheath 108 abuts or is proximate the ferrule 106. The termination tape 112 overlaps a portion of the sheath 108 at the sheath head end 120 and provides a clean transition from the sheath 108 to the ferrule 106 or the shaft 102. The termination tape 112 has a width (e.g., length in the longitudinal direction) between 1 mm and 10 mm. The termination tape wraps around the shaft 102 and the sheath 108 to provide a defined termination of the sheath 108 while compensating for variations in length of the sheath 108 following the application of thermal energy. For example, the sheath 108 may grow or retract toward/away from the ferrule 106 (in the direction of the shaft head end 118) exposing the underlying shaft 102. The termination tape 112 can enhance the termination of the sheath 108 to prevent unintentional tears or ripping of the sheath 108. In an example, the termination tape 112 abuts or is proximate the ferrule 106 and overlaps a portion of the sheath 108 proximate the sheath head end 120. A termination tape may be used at either end of a sheath in other examples.

Figure 2A:
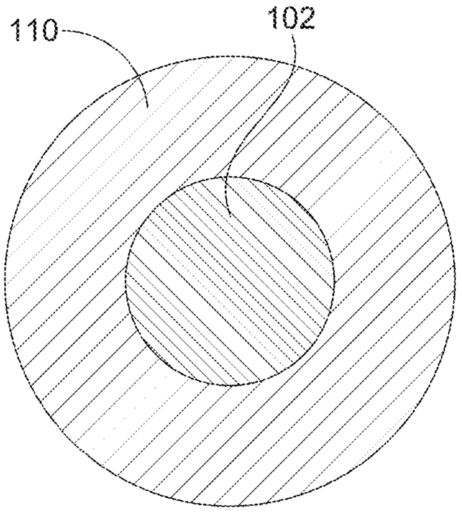
FIGS. 2A-2D depicts cross section views at various location of the golf club shaft of FIG. 1, in accordance with aspects hereof.
Figure 2B:
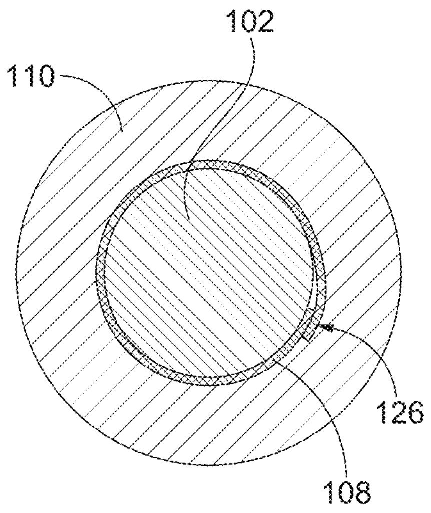
Figure 2C:
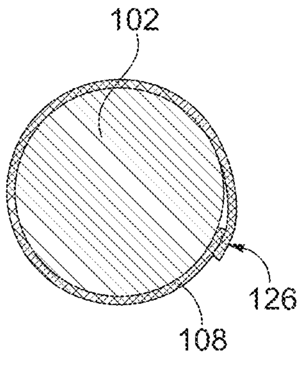
Figure 2D:
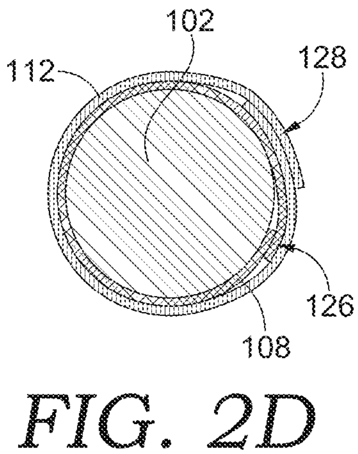

FIGS. 2A-2D depict cross section views at various location of the golf club shaft of FIG. 1, in accordance with aspects hereof. FIG. 2A is a cross section along line 2A-2A of FIG. 1 through the grip 110 and the shaft 102. FIG. 2B is a cross section along line 2B-2B of FIG. 1 through the grip 110, the sheath 108, and the shaft 102. A joint of the sheath 108 is presented as an overlap 126. The overlap 126 is positioned on the shaft 102 at any radial position; however, in an example, the overlap 126 is positioned in a back-side hemisphere of the shaft 102 (e.g., 180 degree directly opposite a direction the head 104 extends from the shaft 102 in FIG. 1). Stated differently, the overlap 126 is on the backside of the shaft 102. The position of the overlap 126 on the backside of the shaft 102 limits visual disruption to a golfer looking down the front side of the shaft 102 and limits tactile interference with a grip of the golfer. FIG. 2C is a cross section along line 2C-2C of FIG. 1 through the sheath 108 and the shaft 102. FIG. 2D is a cross section along line 2D-2D of FIG. 1 through the termination tape 112, the sheath 108, and the shaft 102. The termination tape 112 includes an overlap 128 where a first portion of the termination tape 112 overlaps and secures with a second portion of the termination tape 112.

The diameter of the shaft 102 in FIG. 2A is greater than the diameter of the shaft 102 in FIG. 2B, which is greater than the diameter of the shaft 102 in FIG. 2C, which is greater than the diameter of the shaft 102 in FIG. 2D. This variability in shaft diameter along the cross sections of the longitudinal length of the shaft 102 demonstrates the non-uniform or tapered structure of the shaft 102 for which the sheath 108 compensates as a result of heat shrinking. Stated differently, the diameter of the shaft 102 decreases along the longitudinal length from the grip 110 towards the ferrule 106 and a uniform width sheath is configured to adapt the shaft's taper.

Conversely, a thickness of the sheath 108 in a post-shrink state increases along the longitudinal length extending from the sheath grip end 122 of FIG. 1 toward the sheath head end 120 of FIG. 1. This is a result of a uniform width (e.g., circumference) of the sheath 108 prior to heat shrinking being applied over a tapered shaft 102. The reduction in width resulting from the shrinking process increases a thickness of the sheath material a greater extent as shrinking ratios increase along the tapered shaft from pre-shrink to post-shrink configurations.

The relative size and thicknesses of components depicted in FIGS. 2A through 2D are illustrative only and not representative to actual dimensions.

Figure 3:
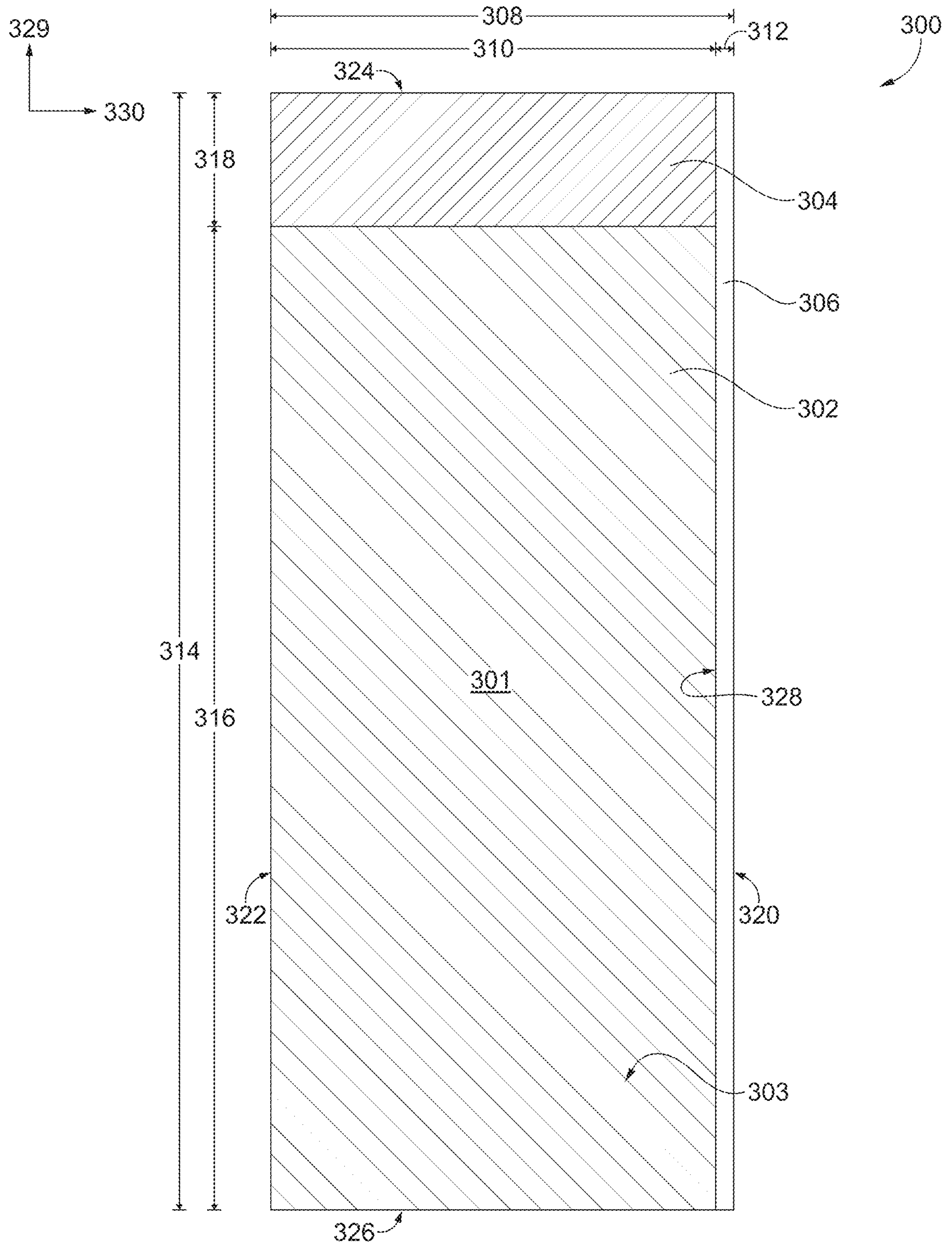
FIG. 3 depicts a first primary surface of a heat-shrink sheath in a planar configuration, in accordance with aspects hereof.

FIG. 3 depicts a first primary surface of a heat-shrink sheath (sheath) 300 in a planar configuration, in accordance with aspects hereof. The sheath 300 is in a planar configuration for printing and eventual welding/bonding into a cylindrical configuration. This planar sheet-like structure also provides an opportunity to depict contemplated portions of the sheath 300 prior to being formed into a cylinder (e.g., sleeve, envelope, substantially planar structure that is folded onto itself (a lay flat configuration)). The portions include a first portion 302 of the sheath 300, a second portion 304 of the sheath, and a third portion 306 of the sheath. For directional purposes, a longitudinal direction is depicted by arrow 329 and a transverse direction is depicted by an arrow 330. The longitudinal direction is parallel with a central longitudinal axis of a shaft to be sheathed. The transverse direction is orthogonal to the central longitudinal axis of the shaft to be sheathed and represents what will be referred to as a circumference of the three-dimensionally formed sheath (e.g., as a cylinder or envelope).

An exterior surface 301 of the sheath 300 is depicted in FIG. 3. An opposite interior surface 305 of the sheath 300 will be depicted in FIG. 4. The sheath 300 has a longitudinal length 314 that extends between a first end 324 and a second end 326. The longitudinal length 314 may be any length. The first longitudinal length 314 may be between 400 mm and 1,100 mm in a first aspect. The first longitudinal length 314 may be between 600 mm and 1,200 mm in a second aspect. The first longitudinal length 314 may be between 800 mm and 1,000 mm in a third aspect. The first longitudinal length 314 may be between 850 mm and 950 mm in a fourth aspect. The first longitudinal length 314 may be between 725 mm and 825 mm in a fifth aspect. The first longitudinal length may adjust depending on the shaft to be sheathed. For example, a shaft for a golf club driver may be longer than a shaft for a golf club iron or putter and therefore the longitudinal length for a sheath will also vary to provide sufficient coverage of the shaft to be sheathed/covered. Similarly, athletic equipment generally vary in longitudinal length and the longitudinal length of the sheath is contemplated to be sufficient for covering at least the length of the shaft to be protected.

The sheath 300 has a width referred to as a transverse length 308. The transverse length extends between first longitudinal edge 322 and a second longitudinal edge 320. As will be discussed hereinafter, the transverse length 308 will exceed the circumference of the formed sheath as a cylindrical structure. This is a result of an intentional overlap of the sheath 300 onto itself to form a joint thereby reducing the circumference length by an amount of overlap, as will be discussed hereinafter.

The first portion 302 and the second portion 304 represent different indicia zones. In an example, the first portion 302 is comprised of a primary indicia to be visible on the shaft after having the sheath applied thereon. In an example, the second portion 304 includes an indicia not intended to be visible on the shaft after the sheath is applied thereon. The second portion 304 may include label information, application instructions, one or more codes (e.g., QR code, barcode) that are useable for directing a user to additional information relevant to the sheath 300 and/or the indicia in the first portion 302. The second portion 304 may also include a URL or other website information relevant to the sheath 300. The second portion 304 has a second portion longitudinal length 318. The second portion 304 may have a transverse length (e.g., a width) equivalent to a first portion transverse length 310. The first portion longitudinal length 316 combined with the second portion longitudinal length 318 equals the longitudinal length 314, in the depicted example.

The first portion 302 has a first portion longitudinal length 316. The first portion 302 has a width labeled as the first portion transverse length 310. The first portion 302 extends, in the depicted example, from the second longitudinal edge 320 toward the first longitudinal edge 322 and terminating at a print layer edge 328. Extending in this same transverse direction from the print layer edge 328 to the first longitudinal edge 322 is the third portion 306, which will be discussed in greater detail below. The third portion 306 has a width labeled as third portion transverse length 312. The summation of the first portion transverse length 310 and the third portion transverse length 312 is the transverse length 308.

In an example, the second portion 304 is 1% to 20% of the longitudinal length 314 and the first portion 302 is at least 79% of the longitudinal length 314. This ratio range allows for a maximization of the indicia captured in the first portion 302 to be useable for visual modification of the underlying shaft sheathed by the sheath 300 while limiting waste from the sheath when sized longitudinally.

While both of the first portion 302 and the second portion 304 are depicted as discrete portions, it is understood that the first portion 302 and the second portion 304 may be indistinguishable in an example. Further, it is contemplated that the second portion 304 may be omitted altogether in an example. Stated differently, the first portion longitudinal length 316 may be equivalent to the longitudinal length 314 in an example omitting the second portion 304. As described above, the first portion 302 may include one or more functional areas and/or indicia intended to be secured to a shaft while the second portion 304 may include one or more functional areas and/or indicia intended to be discarded prior to application to a shaft.

It is contemplated that the sheath 300 may include a transparent window for viewing one or more additional components positioned between the shaft and the sheath. For example, it is contemplated that an identifier for the shaft may be temporarily affixed to the shaft during the application of the sheath to the shaft. Following the application of thermal energy to the sheath constricting the sheath around the shaft, the identifier is now secured to shaft by way of the compression force from the sheath. The identifier is visible through the sheath as well. For example, a QR code, a serial number, a bar code, or the like may be positioned on the shaft prior to application of the sheath and then maintained on the shaft by the sheath and visible through the sheath. The identifier, such as a QR code, can then be registered to be associated with the shaft and/or a user/owner of the shaft. It is contemplated that one or more identifiers may be provided with a sheath to allow a user of the sheath to register his or her golf club(s), in an example where the shaft is a golf club, with a service using the visible identifier that is maintained on the shaft by the sheath. In an alternative to separate identifier and sheaths, it is also contemplated that each sheath may include an identifier, such as a unique QR code, as part of the printed indicia of the sheath. In a similar manner the integrated identifier with the sheath may be registered to the sheath, the purchaser of the sheath, and/or registered by the user of the sheath.

In another contemplated example, a supplemental component may be temporarily affixed or positioned to the shaft prior to application of a sheath. The supplemental component may then be secured to the shaft by the application of the sheath to the shaft. The supplemental component could be an RFID (Radio Frequency Identifier) component for locating and/or identifying the shaft to which it is secure. The supplemental component may be a textured element to induce texture to the shaft. For example, vortex generators may be positioned on the shaft and then secured to the shaft by the application of the sheath that conforms to the textured element during a shrinking (contracting) operation. The texture element could be haptic feedback elements to provide training cues relating to shaft position and placement. The texture elements could be aesthetic in nature to provide a unique and identifiable pattern (e.g., scales, ridges, rings). The texture element could be a silicone strip of three-dimensional features that stand off from the shaft and are maintained by the application of the sheath to the shaft having the texture elements thereon. While the supplemental component is described a discrete component from the sheath, it is also contemplated that the supplemental component is integral with the sheath prior to application to the shaft, in an example. An example contemplated includes printed (or applied) textures on the sheath, such as printed silicone on the interior or exterior surfaces of the sheath. Additional examples contemplated include fibers or textiles structures applied to the interior or exterior surfaces of the sheath.

The sheath 300 is formed from a base sheet 303. The base sheet 303 is a thermoplastic composition as a shrinkable film/sheet. The thermoplastic composition is responsive to a threshold thermal energy causing the thermoplastic composition to contract (i.e., shrink) in one or more dimensions. The thermoplastic composition, in an example, is comprised of at least one selected from a polyester-based composition, a polystyrene-based composition, a polyvinyl chloride-based composition (PVC), a polyolefin-based composition, a polyamide composition, an aramid composition, a polyimide composition, a polyphenylene sulfide composition, or an acrylic-based composition. In a specific example, the base sheet 303 comprises polyethylene terephthalate glycol (PETG).

As used herein, the term composition may comprise a resin. For example, a polyester-based composition comprises a polyester-based resin.

The base sheet 303 is not restricted to a particular polymeric composition, and any conventional well-known resin film can be used. In a specific example, any resin composition may form the base sheet so long as the resin film is solvent weldable to form a joint onto itself. As the resin film, a single kind or a mixture of two or more kinds of thermoplastic resins may be selected from, for example, a polyester-based resin, a polystyrene-based resin, a polyvinyl chloride-based resin, a polyolefin-based resin, a polyamide resin, an aramid resin, a polyimide resin, a polyphenylene sulfide resin, and an acrylic-based resin. A resin film made from the polyester-based resin, the polystyrene-based resin, or the polyolefin-based resin is contemplated in an example.

As a polyester-based resin, a polyethylene terephthalate (PET)-based resin, a poly (ethylene-2,6-naphthalene dicarboxylate) (PEN) resin, a polylactic acid (PLA) resin, or other resins may be used. The PET-based resin is contemplated in connection with athletic equipment applications among these resins. As the PET-based resin, the following resins can be used: polyethylene terephthalate (PET) containing terephthalic acid as a dicarboxylic acid component and ethylene glycol as a diol component; copolyester (CHDM copolymerized PET) containing terephthalic acid as a dicarboxylic acid component, ethylene glycol as the main component of a diol component, and 1,4cyclohexanedimethanol (CHDM) as a copolymer component; copolyester (NPG copolymerized PET) containing terephthalic acid as a dicarboxylic acid component, ethylene glycol as the main component of a diol component, and neopentyl glycol (NPG) as a copolymer component; diol-modified PET such as a copolyester containing terephthalic acid as a dicarboxylic acid component, ethylene glycol as the main component of a diol component, and diol component excluding ethylene glycol such as diethylene glycol as a copolymer component; dicarboxylic acid-modified PET containing terephthalic acid as a dicarboxylic acid component, ethylene glycol as the main component of a diol component, and dicarboxylic acid component excluding terephthalic acid as a copolymer component (in a dicarboxylic acid component, the resin contains terephthalic acid as the main component and is modified with isophthalic acid and/or adipic acid). Alternatively, PET containing a modification component in both of the diol component and the dicarboxylic acid component may be used.

It is contemplated, in an example, that in connection with an athletic equipment use, a PET-based resin is a composition forming at least a portion of the base sheet. In an example of an athletic equipment application, a modified PET that contains terephthalic acid as the main component of dicarboxylic acid and ethylene glycol as the main component of diol component may be leveraged.

As a polystyrene-based resin, a resin containing a single or two or more styrene-based monomers as a component monomer may be used; for example, styrene, alpha-methylstyrene, m-methylstyrene, p-methyl styrene, p-ethyl styrene, p-isobutylstyrene, p-t-butyl styrene, and chloromethyl styrene. Specifically, general purpose polystyrene, styrene-butadiene copolymer (SBS), styrene-butadiene-isoprene copolymer (SBIS), styrene-acrylic acid ester copolymer, and a high-impact polystyrene (HIPS) may be used. It is contemplated to use SBS as the surface layers for a film made from a polystyrene-based resin. Further, it is contemplated that the base sheet comprises a specific polystyrene-based resin, an oriented polystyrene (OBS). OBS has a lower shrink activation temperature than a PET-based composition while providing material properties that are acceptable for forming a sheath on an athletic equipment shaft. In an example, OBS may be more prone to brittleness than PETG following shrinking, which may make it more susceptible to cracking.

As a polyolefin-based resin, the following resins are contemplated: a polyethylene-based resin such as low-density polyethylene (LDPE), linear low-density polyethylene (LLDPE), or metallocene catalyst-based LLDPE (mLLDPE); a polypropylene resin such as polypropylene or propylene-alpha-olefin copolymer; ethylene-vinyl acetate copolymer; and a cyclic olefin resin. It is contemplated to use the cyclic olefin resin as the surface layers for a film made from a polyolefin resin.

The base sheet 303 may have a single layer structure or a laminated structure (multi-layer structure). To form the base sheet 303 from laminated films, two or more films of the same resin or different resins can be laminated. It is contemplated that a polyester-based resin, a polystyrene-based resin, or a polyolefin-based resin such as a cyclic olefin resin at least for the surface layers of the base sheet 303 made from the laminated films may be used. It is also contemplated to use modified PET, SBS, or a cyclic olefin resin. As examples of the base sheet 303, a three-layered or five-layered laminated film may be formed such that a polyester-based resin (e.g., modified PET) is used for the surface layers and a polyolefin-based resin (for example, a polypropylene-based resin and a polyethylene-based resin) or a polystyrene-based resin (for example, SBS) is used for an intermediate layer. As another example, a three-layered or five-layered laminated film may be formed such that a polystyrene-based resin (e.g., SBS) is used for the surface layers and a polyolefin-based resin (for example, a polypropylene-based resin or a polyethylene-based resin) or a polyester-based resin (for example, modified PET) is used for an intermediate layer. A further example is three-layered or five-layered laminated film having a cyclic olefin resin for the surface layers and a polyethylene-based resin or a polypropylene-based resin for an intermediate layer. Furthermore, the laminated film may include five or more layers having, for example, a polyester-based resin (e.g., modified PET) for the surface layers and a polystyrene-based resin for two or more intermediate layers which are laminated with other layers between them (for example, 2 to 35 layers). The laminated film may also include a cyclic olefin resin for the surface layers and a polypropylene-based resin or a polyethylene-based resin for two or more intermediate layers which are laminated with other layers between them (for example, 2 to 35 layers).

The production of the polymeric composition and the base sheet 303 may be approached a number of ways. For example, the base sheet 303 is mainly drawn in a single direction (uniaxial drawing) and is heat-shrinkable in the same direction (main drawing direction), which is in the transverse direction depicted in FIG. 3 in this example. The drawing ratio is about two to six times in the single direction (main drawing direction) in an example. The base sheet 303 is also drawn in the direction perpendicular to the main drawing direction at a drawing ratio of about 1.01 to 2 times (biaxial drawing) such that shrinking and expansion can be restricted in this direction. The heat shrinkage percentage of the base sheet 303 in the main drawing direction is 20 to 80% as tested according to ASTM D1204-14 at 90 degrees C. for 10 second in water. In a specific example, the base sheet 303 (or the sheath 300 as a whole) is capable of shrinking 60 to 80% in the transverse direction tested according to ASTM D1204-14 at 90 degrees C. for 10 second in water. This amount of shrinkage, up to 80%, allows for the sheath 300 to be sized with a sufficient circumference to pass over a golf club grip and still shrink down to a compressive state on the golf club shaft at the ferrule end of the golf club shaft having a laminar (e.g., smooth) constricted state on the shaft. As will be discussed in detail below, having this sufficient shrinkability allows for the application of the sheath 300 to a golf club shaft without the removal of the grip, which speeds up installation and reduces costs.

Further, it is contemplated that the base sheet 303, in an example, is formed from a PET-based composition (e.g., PETG) that shrinks less than 10% in the transverse direction when exposed to thermal energy below 60 degrees C. This minimal shrinkage prevents the sheath 300 from contracting during manufacturing (e.g., printing), storage, and shipping so that the sheath 300 is capable of passing over elements on the shaft, such as a golf club grip, during installation. Additionally, it is contemplated that the base sheet is formed from a PET-based composition that is capable of shrinking between 11 and 80% when exposed to water measuring at 65 degrees C. to 100 degrees C. for 10 seconds in alignment with the other procedures outlined in ASTM D1204-14. A PET-based composition that is sufficiently stable below 65 degrees C. and capable of sufficient shrinkability between 65 degrees C. and 100 degrees C. is appropriate for application to the materials commonly found on a golf club (e.g., shaft material, adhesives, grip, labels, etc.) and other athletic equipment while still being able to be formed, stored, shipped, and applied by average consumers.

The heat shrinkage percentage of the base sheet 303 in the direction perpendicular to the main drawing direction is at 15% or less, in another example it is 10% or less, and in yet another example it is 5% or less. The sheath 300 is formed such that the main drawing direction of the base sheet 303 is the circumferential direction of the sheath 300. Stated differently, the heat shrinkage percentage of the base sheet 303 in the longitudinal direction is at 15% or less, in another example it is 10% or less, and in yet another example it is 5% or less.

Although the thickness of the base sheet 303 is not limited to any particular range, the base sheet 303 in an example has a thickness of 35 microns to 60 microns in an example and 45 microns to 50 microns in another example. The thickness of the base sheet 303 is measured according to ASTM D374-99. A thickness less than 60 microns is effective to provide sufficient protection from scratches and scuffs to an underlying shaft without adding too much mass (e.g., less than 5 grams) to a shaft to materially affect performance and perceived weight by a user. A thickness greater than 35 microns provides sufficient protection to the underlying shaft.

Figure 4:
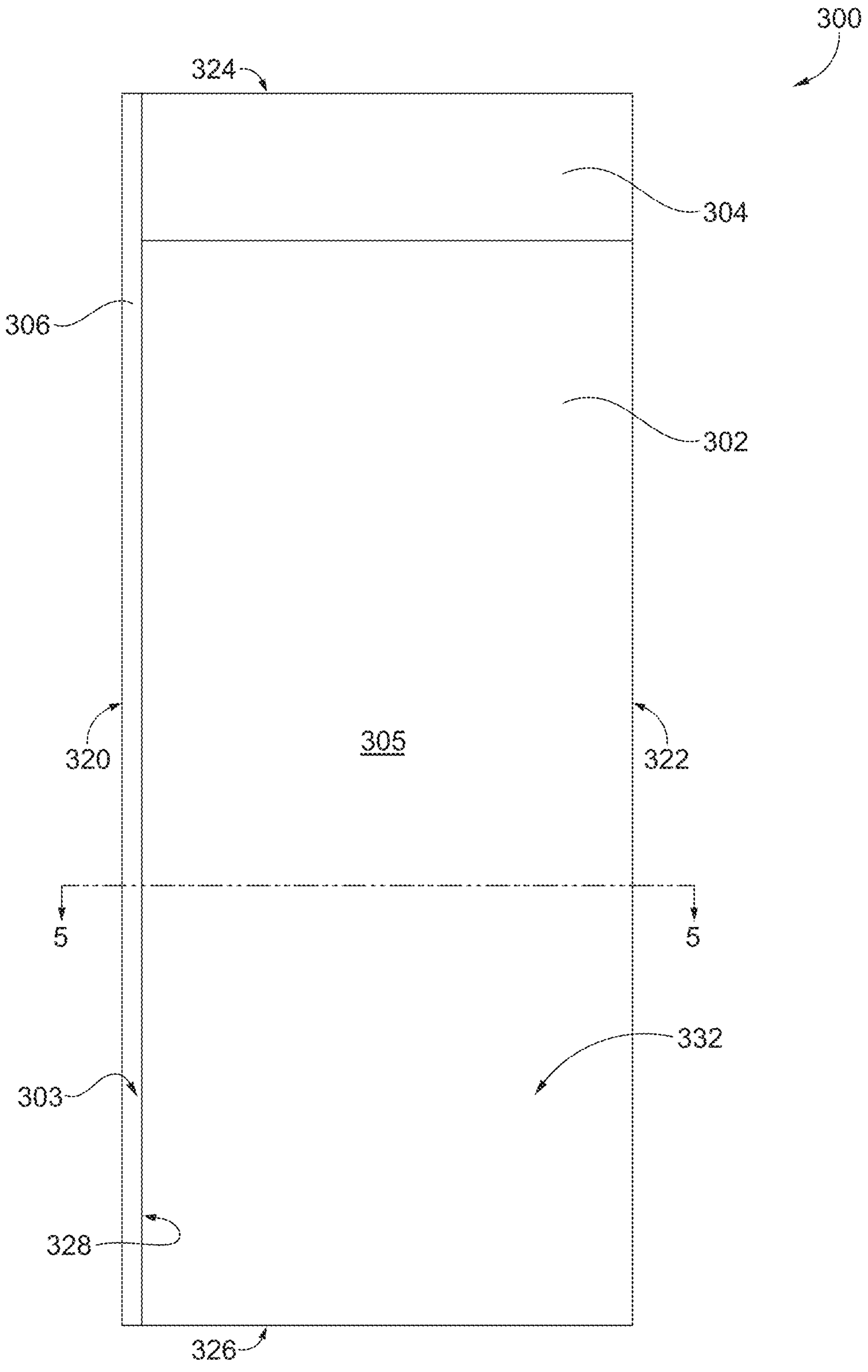
FIG. 4 depicts a second primary surface of the heat-shrink sheath in a planar configuration of FIG. 3, in accordance with aspects hereof.

A conventional surface processing, such as a corona discharge treatment or primer treatment, may be applied to the surfaces of the base sheet 303, such as an interior surface 305 of FIG. 4. The surface treatment is effective to increase a surface energy of the base sheet 303 to more effectively receive and maintain a print layer 332 of FIG. 4.

The base sheet 303, in an example, is a transparent or semi-transparent material. The transparency of the base sheet 303 allows for visual inspection of the sheathed shaft in an example. This visual inspection allows a user, judge, inspector, or the like to validate the condition, material, and/or compliance of the shaft for use. Further, the transparent or semi-transparent nature of the base sheet 303 allows for the print layer 332 of FIG. 4 to be printed on the interior surface and remain visible through the exterior surface. A transparent material is defined, for purposes of this disclosure, as a material having a haze percentage less than 7% measured according to ASTM D1003-21. In an example, the base sheet 303 has a haze percentage between 1 and 7% measured according to ASTM D1003-21.

The base sheet 303 is formed from a thermoplastic composition having a tensile strength of 200-300 Mpa measured in the transverse direction (e.g., circumferential direction) and 30-80 Mpa in the longitudinal direction as measured according to ASTM D882-18 with v=100 mm/min. As discussed above, the sheath 300 is formed in a manner to have significant shrinkability in the transverse direction and relatively minimal shrinkability in the longitudinal direction to appropriately cover and compress a shaft. To achieve this directional shrinkability, the thermoplastic composition is formed with a related tensile strength. Stated differently, a correlation between relative shrinkability and tensile strength in the transverse and longitudinal direction exists. It is contemplated that the base sheet 303 has a relatively high shrinkability and tensile strength in the transverse direction and a relatively low shrinkability and tensile strength in the longitudinal direction.

In an example, the base sheet 303 is formed from a polymeric composition having a tensile strength in the longitudinal direction that is 15 to 27% the tensile strength in the transverse direction measured according to ASTM D882-18 with v=100 mm/min. This discrepancy in tensile strength allows for sufficient compressive strength when shrink around a shaft while minimizing compression in the longitudinal direction in response to thermal energy. This allows for minimal disruption to the function of the sheathed shaft, in an example.

In an example, the sheath 300 is formed from a polymeric composition comprising PETG. PETG is effective as a shrink wrap composition for use on athletic equipment as it has a shrinkability exceeding 60% and up to 80% allowing for a practical shrink percentage discussed below that is appropriate for athletic equipment uses contemplated herein. Within this range the sheath 300 can extend over a golf grip and still conform to a traditional golf club shaft proximate a ferrule, the smallest diameter location to be sheathed. PETG can also be a directional shrinkable material such that the sheath 300 can be sized to a proximate length effective for covering a shaft prior to shrinking and the length remains within 10% of the length following shrinking while still achieving up to 80% shrinkability in the transverse direction. This allows for the sheath 300 to be pre-sized in the longitudinal length prior to application to the shaft. Further, PETG can have a haze percentage less than 7%, which is effective for providing a transparent sheath that allows for inspection of the underlying shaft and for effectively providing transmission of an indicia printed on an inside surface of the sheath 300. Additionally, PETG can be formed in a thickness between 35 to 60 micros while still achieving the desired shrinkability and protection characteristics. At this thickness range the sheath 300 is an effective covering for an athletic shaft, such as a golf club shaft, without interfering with a perceived performance of the shaft. PETG is also capable of achieving a sufficient tensile strength in the transverse direction of 200 to 300 Mpa. Within this tensile strength range the sheath 300 is capable of sufficiently compressing around the shaft to remain in a fixed location without splitting, tearing, or otherwise deforming under a self-induced compression from the shrinking operation.

As provided above, other polymeric compositions are contemplated and may be used in the formation of the sheath 300. However, in an example for use in a golf club shaft application, PETG has proven to supply material characteristics that meet the above ranges. Specifically, a PETG film from Bonset America Corporation, BONPET 8A, is a non-limiting example of a PETG film option that satisfies the criteria provided in examples herein.

Returning to FIG. 3, the third portion 306 is a portion that omits a print layer. As such, the third portion 306 is adapted to receive a solvent (or adhesive, or heat, or other joining technology) that is effective for welding the exterior surface 301 with an overlapping portion of the interior surface 305 (depicted in FIG. 4). The absence of ink or print material in the third portion 306 allows for a reduction in contaminates or other barriers to effective welding between the base sheet 303 material by a solvent (or other joining technique contemplated herein). The third portion transverse length 312 is sized to provide an appropriate region for receiving a solvent and forming a weld sufficient to maintain a bond even with transverse shrinkage above 50% while still providing a complete wrap of indicia in the first portion 302 for surrounding a shaft without introducing a gap in the transverse continuity of the printed indicia. The third portion transverse length 312 is 1 mm to 10 mm in an example. In another example the third portion transverse length 312 is 4 mm to 6 mm. In a specific example the third portion transverse length 312 being set to 3 to 7 mm is used in connection with a sheath intended for a golf club shaft in that it provides sufficient width for applying a solvent without excess overlap of material when forming an overlap joint. A greater size and there is more overlap of the base sheet 303 to achieve a continuous indicia around the circumference and a lesser size increases the potential for contamination in the solvent weld from the ink, in an example. It is further contemplated that the print layer terminates within 0.25 mm to 10 mm of the second longitudinal edge 320 resulting in a third portion transverse length 312 between 0.25 mm and 10 mm.

Turning to FIG. 4 that depicts a second primary surface, the interior surface 305 of the sheath 300 in a planar configuration of FIG. 3. FIG. 4 includes a cutline 5-5 representing the cross section depicted in FIG. 5.

FIG. 4 also depicts the print layer 332 on the interior surface 305. The print layer 332 defines the bounds of the first portion 302 relative to the third portion 306. As such, the presented surface of the sheath 300 in FIG. 4 in the first portion 302 is the print layer 332 and the presented surface of the sheath 300 in the third portion 306 is the base sheet 303.

In an example, the print layer 332 allows for displaying indicia, such as product names, illustrations, cautions in using the products, decorative patterns, or the like can be displayed on (or through) the base sheet 303. Although the print layer 332 may be formed on the exterior surface 301 of the sheath 300, it is contemplated that print layer 332 is an inner layer (e.g., formed on an inner surface) of the sheath 300 in order to prevent abrasions or the like of the print layer when applied to and used as a protective covering on a shaft.

A layer other than the print layer 332 may also be provided on the base sheet 303. For example, a protection layer may be provided on an earlier applied layer of print layer 332. The protection layer may be a solid color layer that is effective to obscure portions of the underlying shaft to which the sheath is applied. The protective layer may be a white, black, or other foundation color. Since the print layer having indicia intended for display through the sheath is applied prior to the protective layer, the protective layer serves as a background to the printed indicia as the indicia is seen through the material. The protective layer may comprise two or more layers of foundational color (e.g., white) to build a substantially opaque layer that limits visibility of portions of the shaft to which the sheath is applied. Further, as will be discussed hereinafter, it is contemplated that another coating, a slip coat, is applied following the protective layer(s). Therefore, in an example, the print layer 332 may comprise one or more layers applied that are intended to provide indicia (e.g., letters, words, images, patters) visible through the base sheet 303, one or more protective layers, and a slip coating.

Further, an overcoat layer may be disposed on the exterior surface 301 of the base sheet 303 except for proximate the third portion 306. The overcoat may include a stipple pattern that following shrinking forms a matte finish on the exterior surface 301. The matte finish provides additional control over the aesthetics of the sheath when applied to an article. Further, the overcoat layer, since it is on an exterior surface, can provide a wear indication for the underlying shaft. For example, the overcoat can identify scraping, rubbing, and other abrasive action that may impact the underlying article had the sheath not been applied. This can signal to a user corrective action in handling, storage, or transport of the article.

The print layer 332 is formed with a mirror image of the indicia to be viewed on the shaft when the print layer 332 in on an interior surface of the base sheet. This is done because it is a layer on the interior surface 305 to be viewed through the base sheet 303. Further, as will be discussed in greater detail in FIG. 12, the indicia is also scaled to accommodate the transverse shrinkability and minimal longitudinal shrinkage resulting from the application of sufficient thermal energy. For example, the indicia is scaled at printing to shrink between 40 to 60% in the transverse direction and scaled to shrink less than 5% in the longitudinal direction to result in an appropriately scaled indicia following the application of thermal energy.

The print layer 332 provides an advantage related to the shrinkability of the sheath 300. Specifically, the print layer 332 has a more controllable, which may be less, coefficient of friction relative to the shaft than the base sheet 303 has relative to the shaft, in an example. This lower coefficient of friction (COF) because of the print layer 332 (and/or slip coat discussed below) allows the sheath 300 to more uniformly shrink around a small circumference (e.g., less than 200 mm) shaft having a substantially constant surface texture. This is in contrast to a larger format cylinder, such as a drink bottle or a variable texture cylinder, e.g., bottle having indentions for gripping, where the circumference and/or surface texture allows for easier sliding of the base material during a shrinking process. In the present example, the print layer 332 on an interior surface of the sheath 300 aids in the positional adjustment of the sheath 300 during the shrinking process to limit creases and puckers caused by the sheath "sticking" to the underlying shaft and not moving during the constriction. Stated differently, an interior print layer that is between the shaft and the base material allows for the base sheet to conform to the shaft during the shrinking process by allowing the base sheet to positionally adjust.

In an example, it is contemplated that the print layer 332 covers at least 70% of the surface area of the interior surface 305. At least 70% of coverage of the print layer 332 provides a sufficient degree of consistent COF for the sheath to constrict around a shaft with limited wrinkles and other surface deformities created during the shrinking operation. In another example, it is contemplated that a coating, sometimes referred to as a slip coat, is applied over the print layer 332 and exposed portions of the interior surface 305 to provide a more uniform COF even in areas lacking a print layer 332. This substantially uniform COF provides sufficient slip to the sleeve for conformance to the shaft during the shrinking process.

A slip coating, in an example, is printed (or otherwise applied) on the surface of the sheath exposed to the article onto which the sleeve will be secured. The slip coating provides a kinetic COF in a range of 0.275 to 0.400. In a specific example, it is contemplated that the slip coating has a kinetic COF of 0.325 (+−15%).

In another example, a slip coating can be expressed as exhibiting a slide angle of approximately 16 degrees to 20 degrees. In a specific example the slide angle is 18 degrees (+−10%), which has been found to be effective for applying to sports equipment shafts without introducing defects (e.g., bunching, pinching, puckering) as the sheath contracts around the sports equipment shaft. As used herein, the term "slide angle" refers to the minimum angle of inclination at which a sample placed on a similarly inclined plane begins to slide under its own weight. The slide angle provides an indirect measurement of the surface's coefficient of friction, with lower angles indicating greater surface lubricity or slip. The slide angle may be measured according to ASTM D4917, or equivalent methods, wherein a specimen is placed on a flat test panel that is gradually inclined until the sample initiates downward movement. The angle at which movement begins is recorded as the slide angle.

The slip coating, in an example, has been found to impact the quality of application and provide a reduction in defects following a shrinking process. Without an appropriate slip coat, the defect rate caused by unintended wrinkles, bunching, puckers, and the like were found to be at least twice as high as to when an appropriate slip coat is applied over a print layer and/or the polymer base material.

Another material property considered with an effective slip coating for use in aspects contemplated herein is the heat resistance of the slip coating material. In an example, the heat resistance of the slip coating is evaluated by subjecting the coated surface to elevated temperature and pressure under controlled conditions. Specifically, the test involves applying a heated metal platen to the slip-coated surface at a temperature of 149° C. with a dwell time of 1 second and an applied pressure of 207 kPa. During this test, the sample is placed in direct contact with the heated platen, simulating conditions such as those encountered in thermal sealing, lamination, or other high-temperature processing environments. The dwell time represents the duration for which the pressure and temperature are maintained on the sample. Following exposure, the coated surface is examined for degradation, discoloration, distortion, or loss of slip functionality, indicating the coating's ability to withstand thermal and mechanical stress without failure. A slip coating able to withstand thermal resistance testing as provided above provides an effective slip coating for the contemplated heat-shrink conditions of the sheath contemplated to be applied to a sports equipment shaft.

In an example, the slip coating may be formed from an aqueous-based clear varnish suitable for use in shrink sheath applications. The slip coating may include a film-forming polymer selected from acrylic polymers, styrene-acrylic copolymers, urethane-modified acrylics, or combinations thereof. To reduce surface friction, the slip coating may further comprise one or more slip additives, including silicone emulsions, fluoropolymers, or wax dispersions. In an example, the slip additive comprises a polydimethylsiloxane (PDMS) emulsion or a polyethylene wax dispersion, which improves slip and mar resistance without compromising optical clarity. Optional additives may include surfactants for leveling and wetting, plasticizers to enhance flexibility during thermal shrinking, and antiblock agents to reduce surface tack during winding and unwinding. The resulting slip coating is clear, heat-resistant, and capable of maintaining slip performance following exposure to temperatures up to 149° C. for 1 second under 207 kPa of pressure.

However, in an example, the slip coat does not contain silicone. A slip coat containing silicone, in this example, provides too low of a COF to the sheath causing the sheath to shrink in the longitudinal direction more than expected and exposing portions of the underlying article during a shrinking operation (e.g., exposing the tip end of a golf club shaft). Therefore, a slip coating having a kinetic COF of 0.325 (+−15%) provide sufficient slippage during the shrinking process but limits unintended longitudinal shrinkage that may expose a portion of the underlying article. It has also been found, in an example, that the slip coat should not contain ultraviolet light inhibitors, which may adversely react with underlying articles.

The ink used to for the print layer 332 may be any ink suitable for a polymer composition forming the sheath 300. Characteristics of the ink include low distortion and low cracking while having flexibility after being shrunk. Inks contemplated for forming the print layer 332 (and/or other layers, such as an interior-most (shaft facing) coating) may be solvent-based ink, water-based ink, UV cationic ink, UV free radical ink, and/or digital inks. It is contemplated in a specific example that an ink comprising UV cationic ink or a solvent-based ink that are capable of shrink up to as much as 70-80 percent are suitable for high-shrink applications contemplated herein (e.g., capable of shrink of over 50%). Flexography, gravure, offset or digital printing processes are all contemplated for applying the print layer 332 (and/or other coatings) to the base sheet 303. Similarly, the composition used for the slip coating should also have the ability to shrink as much as 70-80 percent are suitable for high-shrink applications contemplated herein (e.g., capable of shrink of over 50%).

The slip coat may be a portion of the discussed print layer 332. For example, the print layer 332 may comprise a plurality of layers. For example, the print layer 332 may include a colored composition applied (e.g., printed) in one or more portions forming an indica, then have one or more layers of a topcoat applied, and also include a slip coat covering the colored composition, the topcoat, and/or other portions of the underlying sheath material.

Figure 5:
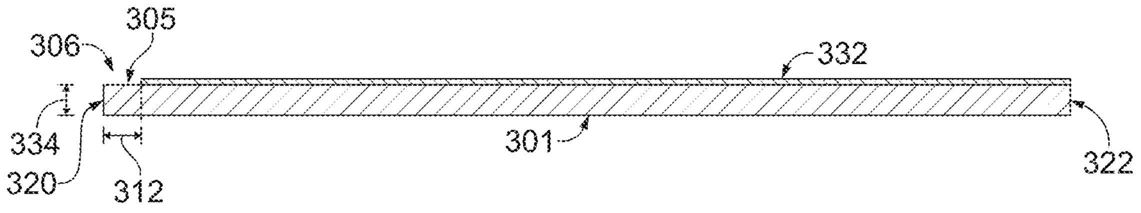
FIG. 5 depicts a cross section along line 5-5 of the heat-shrink sheath of FIG. 4, in accordance with aspects hereof.

FIG. 5 depicts a cross section along line 5-5 of the heat-shrink sheath of FIG. 4. Depicted is the termination of the print layer 332 to define the third portion 306. Also depicted is a thickness 334 of the base sheet 303. As provided above, the thickness 334 is contemplated as 35 microns to 60 microns in an example and 45 microns to 50 microns in another example. The thickness of the base sheet 303 is measured according to ASTM D374-99. A thickness less than 60 microns is effective to provide sufficient protection from scratches and scuffs without adding too much mass to a shaft to materially affect performance and perceived weight by a user. A thickness greater than 35 microns provides sufficient protection to the underlying shaft of athletic equipment.

Figure 6:
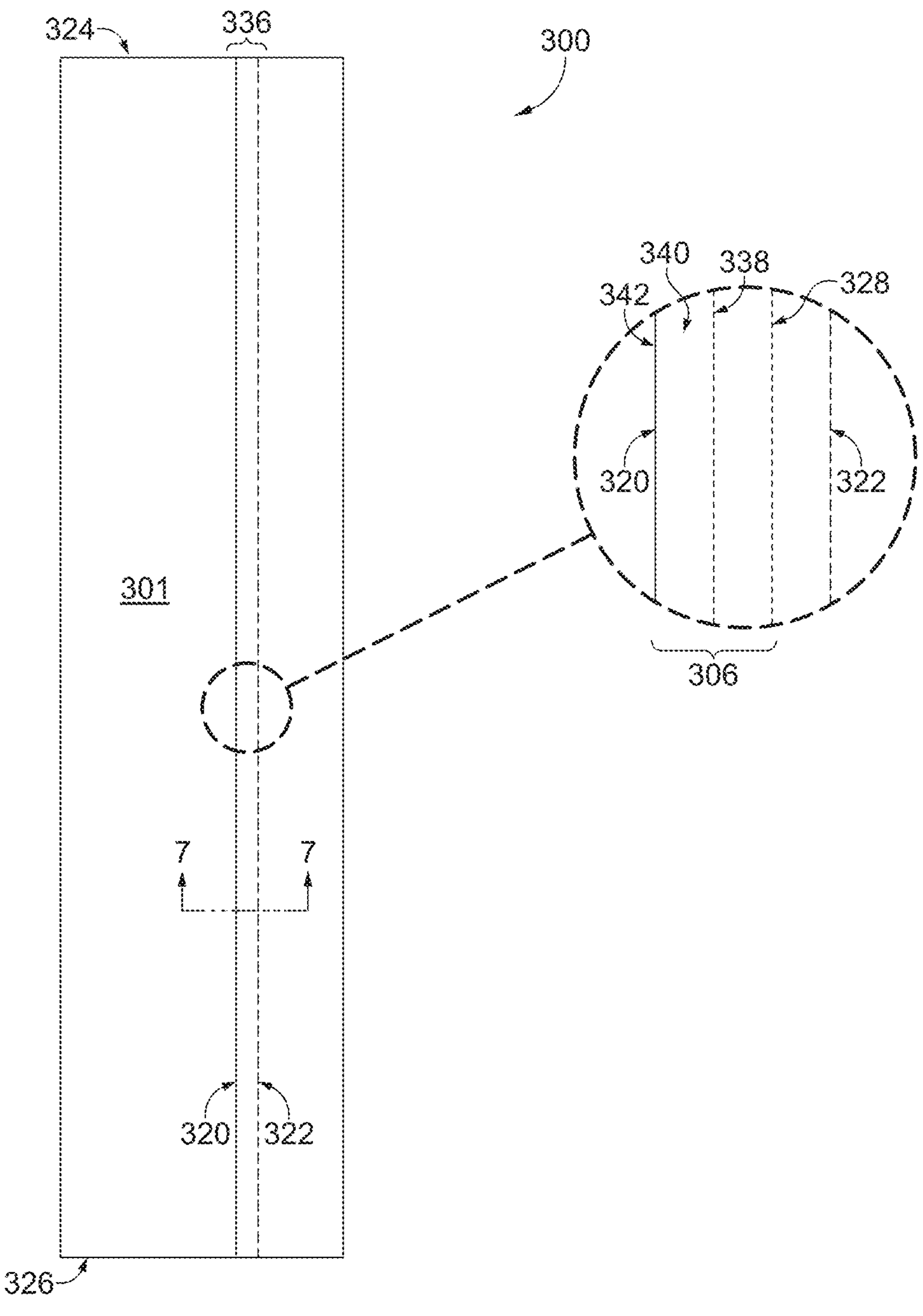
FIG. 6 depicts the heat-shrink sheath from FIG. 3 in an envelope configuration with a zoomed in portion of an overlap forming the envelope, in accordance with aspects hereof.

FIG. 6 depicts the sheath 300 from FIG. 3 in an envelope configuration with a zoomed-in portion of an overlap 336 forming the envelope. As used herein the term envelope is a compressed cylinder structure, therefore, the term cylinder is not limited to a structure having a circular cross section in a transverse direction. Instead, a cylinder includes any sleeve-like construction that includes a substantially planar envelope, an ovular cross section, or the like. Similarly, the term circumference is not limited to a measure of a circular cross section but instead is a measure of linear distance of the enclosing structure, regardless of cross section shape. Therefore, while the sheath 300 is discussed as in a cylinder construction, it contemplated that it may be compressed into a substantially planar structure, like an envelope, which can then be opened to form a cylinder having a more circular cross section. The use of the term circumference and variations thereof is for convenience to convey a distance around a surface regardless of the shape of that surface.

The envelope configuration of FIG. 6 is created by wrapping the base sheet over on itself such that the second longitudinal edge 320 overlaps the exterior surface 301 and the first longitudinal edge 322 underlays that interior surface. As such an overlap 336 is formed between the first longitudinal edge 322 and the second longitudinal edge 320. The overlap 336 is wider than the third portion transverse length 312 to provide tolerance for joint quality and indicia continuity. The overlap 336 includes a joint 340 between a first joint edge 338 that is at the second longitudinal edge 320 in this example and a first joint edge 338. The first joint edge 338 and the second joint edge 342 are formed by the application of a solvent (or other bonding agent) useful for creating a weld of the base sheet material. The overlap 336 also includes a portion of the third portion 306 between the first joint edge 338 and the print layer edge 328. The overlap 336 is zoomed in within FIG. 6 to further highlight the various portions and zones contained therein.

Figure 7:
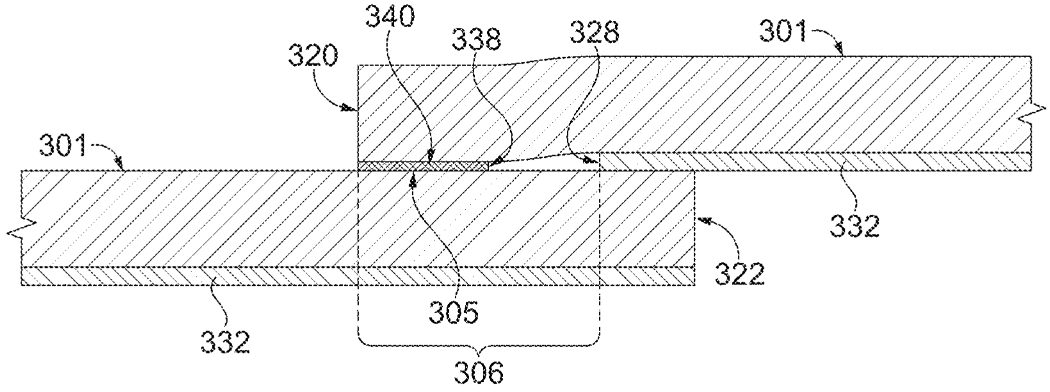
FIG. 7 depicts a cross section along line 7-7 of the heat-shrink sheath of FIG. 6, in accordance with aspects hereof.

FIG. 7 depicts a cross section along line 7-7 of the sheath 300 of FIG. 6. As depicted, the overlap 336 is greater than the third portion 306 to ensure there is continuity of the print layer 332 around a perimeter (e.g., circumference) of the sheath 300. Further, depicted is the joint 340 formed from a solvent weld (or other bonding technique) between the exterior surface 301 and the interior surface 305. In this example, the joint 340 does not extend into the print layer 332. As discussed above, the isolation of the joint 340 from the print layer 332 ensure the resulting joint is sufficiently strong to withstand the tensile force applied to the sheath 300 following shrinkage of the sheath 300.

Figure 8:
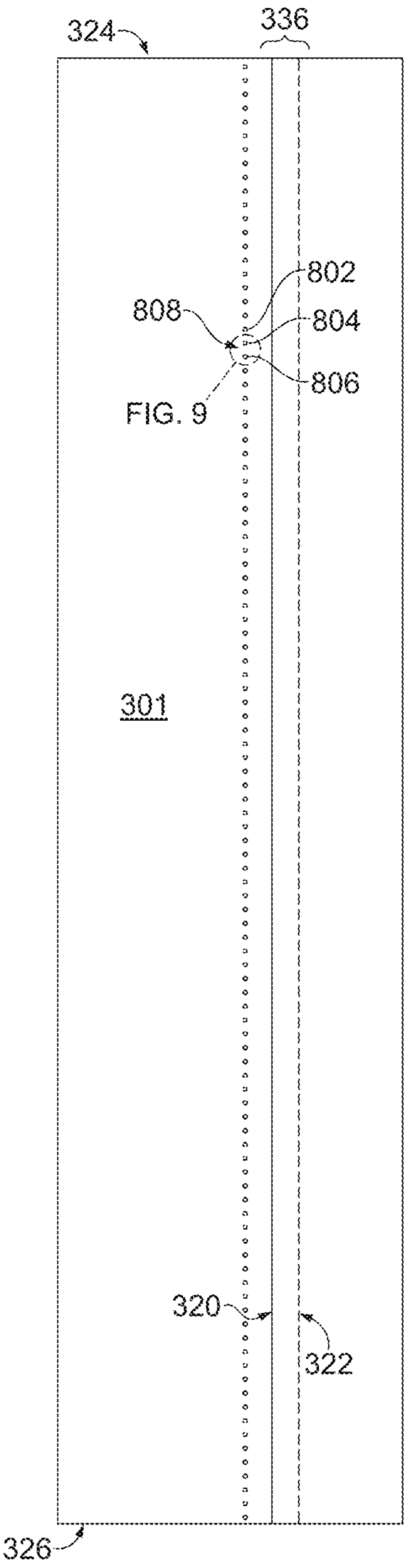
FIG. 8 depicts the heat-shrink sheath of FIG. 6 having a longitudinal perforation, in accordance with aspects hereof.

FIG. 8 depicts the sheath 300 of FIG. 6 having a longitudinal perforation 802. As discussed above, the inclusion of perforation, such as the longitudinal perforation 802, allows for the removal of the sheath 300 from the shaft following application to the shaft without using tools (e.g., a knife) that could potentially damage the underlying shaft. For example, it is contemplated that the tensile strength in the transverse direction is greater than in the longitudinal direction, which makes it difficult to rip the sheath 300 down the longitudinal length (e.g., ripping across the stronger grain rather than ripping between the stronger grain).

In some examples the inclusion of a perforation can insert undesired characteristics unless the perforation is positioned and sized appropriately. The size of the perforation should be a micro perforation rather than a macro perforation, in some examples. A macro perforation is not desired, in some applications, because the amount of shrinkage of the sheath contemplated to compress to the underlying article is relatively large as discussed above. The shrinkage of the material accentuates the size of the perforation in some cases, which can detract from the overall appearance of the sheath in a shrunk configuration. Additionally, a macro perforation may be susceptible to breaks during and following a shrinking operation over 40%. In a golf club application where the sheath is configured to pass over a grip prior to shrinking, the shrinkage anticipated is greater than 40%. Therefore, a micro perforation is contemplated for the longitudinal perforation 802.

Figure 9:
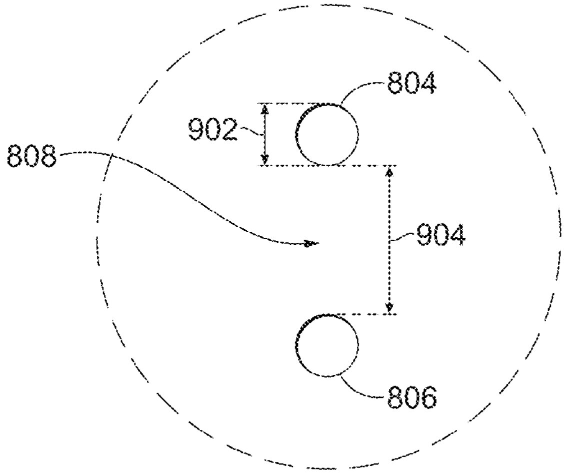
FIG. 9 depicts a zoomed in view of the longitudinal perforation of FIG. 8, in accordance with aspects hereof.

A perforation is formed from an alternating series of perforation (e.g., punctures, apertures, holes) and ties (e.g., continuous material with surrounding material). The longitudinal perforation 802 comprises a first perforation 804 a second perforation 806 and an intervening tie 808. Turning briefly to FIG. 9 that depicts a zoomed in view of the longitudinal perforation 802 of FIG. 8. The first perforation 804 has a first size 902 (e.g., width, length, diameter) and the tie 808 has a tie length 904 (e.g., distance between the first perforation edge and the second perforation edge). A perforation is classified by the number of ties per length, such as inches. Commonly referred to as a TPI representing Ties Per Inch. It is contemplated that the micro perforation forming the longitudinal perforation 802 has 10 to 50 ties TPI. It is further contemplated that the micro perforation forming the longitudinal perforation 802 has 15 to 40 ties TPI. It is further contemplated that the micro perforation forming the longitudinal perforation 802 has 20 to 30 ties TPI.

In an example, the first size 902 is 50 to 150% the tie length 904 with the TPI between 10 to 50. In this configuration, the longitudinal perforation 802 is effective for use on athletic equipment shafts without sacrificing sheath conformance to the shaft.

The perforations, while optional, have been found to provide advantages in some applications. For example, a perforation assists in limiting defects from the shrinking operation. Air may be trapped between the sheath and the underlying article during the shrinking process and form pockets of trapped air. The perforation provides frequent apertures that serve as vents during the shrinking process to limit trapped air. Further, the perforations serves as a removal enhancement feature that is effective to guide a user in the removal of the sheath without damaging an underlying article. As provided above, because of the enhanced tensile strength in the transverse direction of contemplated polymer compositions, the perforation assist in providing intentional discontinuity of the material in the transverse direction to assist in the intentional breaking of the sheath for removal.

Returning to FIG. 8, the longitudinal perforation 802 is spaced away (i.e., offset) from the overlap 336. This prevents a weld or other joining structure from inhibiting the ability of the longitudinal perforation 802 from splitting the sheath 300. However, it is contemplated that the longitudinal perforation 802 is positioned in the transverse direction within 10 mm of a longitudinal edge of the base sheet. For example, the longitudinal perforation 802 is positioned within 10 mm of the first longitudinal edge 322 in an example. Further, it is contemplated that the longitudinal perforation 802 is positioned within 10 mm of the second longitudinal edge 320. Further yet, it is contemplated that the longitudinal perforation 802 is positioned with 10 mm of both of the first longitudinal edge 322 and the second longitudinal edge 320 when the sheath is in a cylindrical (e.g., envelope) configuration. Further yet, it is contemplated that the longitudinal perforation 802 is offset from one of the first longitudinal edge 322 or the second longitudinal edge 320 by less than 45% of the circumference of the sheath 300 in a cylindrical configuration. This position allows of the seam and perforation to remain within a common hemisphere of a shaft to limit user distraction.

The position of the first longitudinal edge 322 within the same hemisphere as the joint 340 allows both the first longitudinal edge 322 and the joint 340 to be positioned on a shaft in optimized location beyond an in-use visibility angle and/or outside of a handling region of the shaft in use. For example, in a golf club use configuration, the first longitudinal edge 322 and the joint 340 can be positioned at an underside of the shaft as viewed in an in-use position (e.g., opposite hemisphere as a direction from which the club head extends from the shaft) to minimize visual distraction of the golfer.

It is contemplated that the longitudinal perforation 802 extends at least 75% of the longitudinal length 314 of FIG. 3. In yet another example, the longitudinal perforation 802 extends the entire longitudinal length 314 of FIG. 3. Having the longitudinal perforation 802 extend the entire longitudinal length 314 provides for a continuous manufacturing process of the sheath 300 and enhanced efficiencies in material use as a continuous strip of sheaths (e.g., see FIG. 11 hereinafter) may be formed and then cut to desired length without limitations of the longitudinal perforation 802 position on the continuous strip.

It is contemplated that the longitudinal perforation 802 extends through the print layer 332. Allowing the longitudinal perforation 802 to extend through the print layer 332 allows for the longitudinal perforation 802 to be sufficiently offset from the overlap and joint forming the sheath while still providing continuity of the print layer 332 around the circumference of the sheath 300. Otherwise, the longitudinal perforation 802 could be accentuated by a lack of print layer 332 drawing visual attention to the location of the longitudinal perforation 802. Further, it is contemplated that the print layer 332 terminates at the print layer edge 328 of FIG. 7 positioned between the longitudinal perforation 802 and the first joint edge 338 of FIG. 7. Further, the longitudinal perforation 802 is contemplated as extending parallel to the first longitudinal edge 322 and/or the second longitudinal edge 320.

Figure 10:
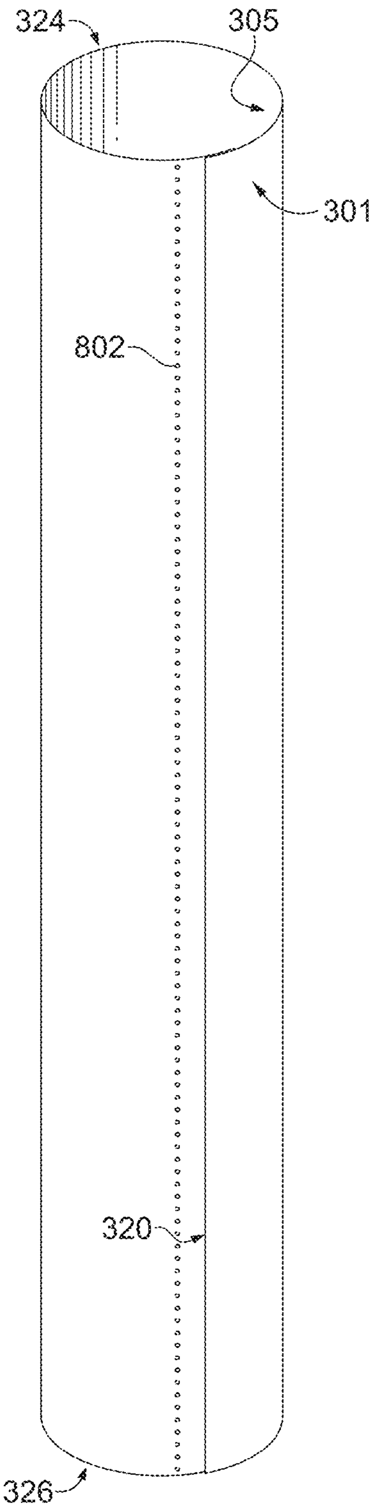
FIG. 10 depicts a perspective view of the heat-shrink sheath of FIG. 8 in a cylindrical configuration, in accordance with aspects hereof.

FIG. 10 depicts a perspective view of the sheath 300 of FIG. 8 in a cylindrical configuration. As provided above, the term cylinder and derivations of the same are not strictly construed to a circular cross section as depicted in FIG. 10. Instead, cylinder, for purposes of the present disclosure, includes a substantially planar sheath having an envelope-like structure. This is in part a result of the film-like material forming the base sheet used to construct the sheath 300. The film-like structure is intentionally thin (e.g., 35-60 microns) to minimize perceived impact to the shaft onto which it is applied. The intentional thin nature of the sheath 300 prevents the sheath 300 from maintaining a consistent structure, such as a cylinder. Further, the cylinder may intentionally be compressed into a substantially planar structure (also referred to as a lay flat configuration) for purposes of forming a continuous roll formed from a plurality of sheaths 300 in a continuous strip (e.g., see FIG. 11 hereinafter). Therefore, while the term cylinder is used herein, it is understood to broadly include a concept of a flattened structure that is substantially planar in a configuration. Regardless of the pre-installed shape and configuration, the sheath 300 is capable of forming into a cylinder structure. As also discussed above, the concept of a circumference is used to convey an internal length measured from a first point around the surface back to the first point (e.g., a longitudinal edge exposed on an interior surface of the sheath 300). In light of the broad interpretation of the term “cylinder” (and derivation of the same) in the present disclosure, it is intended that the term circumference is also not limited to a measure about a circular perimeter. Instead, the circumference of a flattened cylinder (e.g., lay flat) into a substantially planar structure can be approximated, for purposes of this disclosure and the materials contemplated to form the sheath 300, by doubling an internal width of a sheath 300 when in a substantially planar configuration. It is also contemplated that a substantially planar sheath 300 may be forced into a traditional circular cross section for a traditional circumferential measurement as an alternative to doubling an internal width of a substantially planar sheath 300.

The measured circumference (or the doubled width of a substantially planar sheath, also referred to as a lay flat size) is contemplated as being 30 to 170 mm. In another example, the measured circumference is contemplated as being 40 to 155 mm (or a lay flat width of 20 to 77.5 mm). In another example, the measured circumference is contemplated as being 47 to 57 mm (or a lay flat width of 23.5 to 28.5 mm) for application to a golf club driver shaft. In another example, the measured circumference is contemplated as being 90 to 100 mm (or a lay flat width of 45 to 50 mm) for application to a golf club shaft where the sheath is intended to pass over a golf club grip. In another example, the measured circumference is contemplated as being 75 to 90 mm (or a lay flat width of 37.5 mm to 45 mm) for application to a non-driver golf club shaft where the sheath is not intended to pass over a golf club grip.

The circumference (or lay flat size doubled) of a contemplated sheath is important to reduce defects from a shrinking process of a sheath around an athletic shaft. For example, a typical shaft used with a driver (and some woods) has a butt end (i.e., grip end) circumference around 48 mm and a tip end (i.e., head end) circumference around 26 mm. A golf club shaft for an iron has a butt end (i.e., grip end) circumference around 47 mm and a tip end (i.e., head end) circumference around 28 mm. A typical golf club grip, at the butt end (e.g., distal end), has a circumference around 84 mm. Therefore, a sheath intended to pass over a grip must have a circumference that exceeds the grip’s largest circumference while being able to effectively and without defect shrink to a circumference at the tip end. Therefore, for irons where a sheath is to be installed over a grip, the sheath will have a circumference greater than about 84 mm and still have the capacity to shrink down to a circumference of about 28 mm.

In light of the above with a specific focus on a golf club shaft application, it is contemplated, in a non-limiting example, that a sheath has longitudinal length of 850 to 950 mm and a circumference of 50 to 55 mm for application to a golf club driver having a removable golf club driver head.

In an example, the driver shaft tapers from a circumference of about 47 mm proximate the grip to 26 mm proximate the driver head. In this example the sheath will have about a 45% shrinkage required at the driver head location of the shaft to conform with the driver shaft. In this example, the sheath is applied from the head end of the golf club shaft and therefore the sheath does not need to pass over the grip that may have a circumference of about 84 mm. In the example of a golf club driver shaft having a minimal circumference of about 25 mm, a sheath capable of passing over a traditional grip would need to shrink about 70%, which exceeds a consistent shrinkage percentage for a sheath formed from PETG that is consistently free from shrink-induced defects, in an example. Therefore, a golf club driver shaft is contemplated receiving a sheath sized smaller than the grip circumference and instead installed from the head end with a removable driver head and/or installed from the grip end with the grip removed.

A golf club that is a non-driver (e.g., irons, wedges, putter) traditionally has a larger circumference at the head end of the shaft than a driver shaft, as discussed above. In an example of a non-driver golf club shaft where a sheath passes over the grip, a maximum shrinkage is about 67% to conform the sheath to the shaft proximate the club head, which is below a consistent maximum shrinkage expected for a sheath formed from PETG. Therefore, a sheath formed from PETG, in an example, is capable of conforming to a non-driver shaft while still capable of passing over a traditional grip on the non-driver shaft.

In yet another example of a non-driver shaft it is contemplated that the grip may be removed such that a sheath having a circumference between 52 mm and 83 mm is effective to pass over the non-driver shaft at the grip end with the grip removed. In this example there is an expected maximum shrinkage of about 50%, which is well below an expected maximum consistent shrinkage for a sheath formed from PETG.

It has also been found that sufficient tolerances between a circumference of a sheath and a grip circumference are important for an ability to slide a sheath over a grip. Traditionally grips are formed from materials that have a relatively high COF to enhance playability and grip by a user during use. While advantageous for the play of the golf club, the COF of the grip can make sliding a sheath thereover difficult unless sufficient tolerance is provided between the sheath and the grip. Therefore, in an example, a sheath circumference of a sheath should exceed the largest circumference of the grip by at least 2 mm, in an example. Stated differently, to limit damage to a sheath during a donning operation, the sheath diameter should exceed the grip diameter by at least 2 mm, in a non-limiting example.

It is this enhanced circumference of the sheath relative to the grip that further exaggerates the shrink percentage necessary to contract to the shaft at the tip end. Therefore, a sheath having a 92 mm circumference, in a non-limiting example, is capable of passing over a traditional grip while still being able to contract to a tip end circumference of around 28 mm. This is roughly a 70% shrink percentage. However, the same 92 MM circumference sheath, in an example, has not been able to shrink without defects consistently to a tip size of 23 mm found on a driver. This is roughly a 75% shrink percentage. Therefore, in a non-limiting example, a PETG-based sheath has an effective shrink percentage less than 75% when applied to a golf club shaft. While the material forming the sheath is capable of shrinking more than 75%, the sheath does not consistently have a laminar (e.g., smooth) form on the underlying article following shrinking. Therefore, while capable of exceeding 75%, the potential for non-laminar final state limits example aspects to shrinkage rates less than 75% for a PETG-based sheath as applied to an article of sports equipment. Specific to a golf club shaft having a butt end circumference less than 50 mm, it is contemplated that the sheath circumference will not exceed 200 mm for a PETG-based sheath if a maximum shrink percentage of 75% is maintained.

Figure 11:
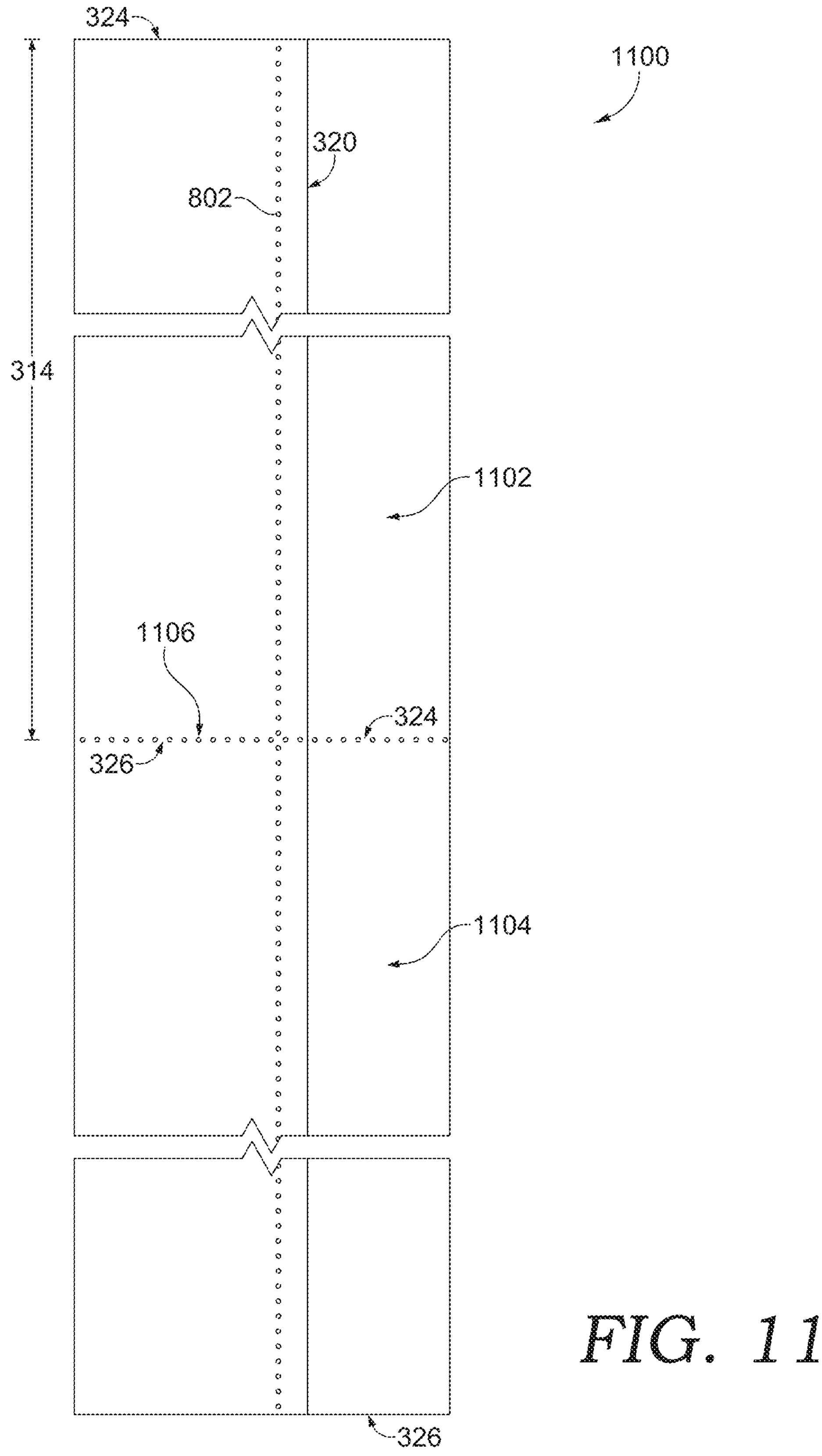
FIG. 11 depicts a continuous series of heat-shrink sheaths from FIG. 6 separated by transverse separators, in accordance with aspects hereof.

FIG. 11 depicts a continuous series 1100 of heat-shrink sheaths from FIG. 6 separated by transverse separators 1106. The series 1100 of sheaths includes a first sheath 1102 and a second sheath 1104. Both of the first sheath 1102 and the second sheath 1104 are comparable to the sheath 300 discussed herein in connection with a number of figures, such as FIG. 3. Of difference, however, the transverse separator 1106 defines the first end 324 for the second sheath 1104 and the transverse separator 1106 defines the second end 326 for the first sheath 1102. In this way, a continuous manufacturing process may be implemented such that a plurality of sheaths may be printed, perforated, and folded into a cylinder (e.g., substantially planar envelope) in a continuous operation. This increases manufacturing efficiency, reduces waste, increases constancy among sheaths, and provides an effective storage solution as the series 1100 may be rolled up onto itself in the longitudinal direction to form a real/roll of connected, but separable along the transverse separator 1106, sheaths.

The transverse separator 1106 is representative of a where a transverse cut may be formed. The transverse separator 1106 is merely illustrated for purposes of understanding and may not be a physical element. In other examples the transverse separator 1106 is a perforation formed in the material. Specifically, the transverse separator 1106 may be any perforation configuration contemplated herein with respect to the longitudinal perforation 802. It is contemplated that the micro perforation forming the transverse separator 1106 has 10 to 50 TPI. It is further contemplated that the micro perforation forming the transverse separator 1106 has 15 to 40 TPI. It is further contemplated that the micro perforation forming the transverse separator 1106 has 20 to 30 ties TPI. In an example, the transverse separator 1106 and the longitudinal perforation 802 have a common perforation configuration for a common sheath.

Figure 12:
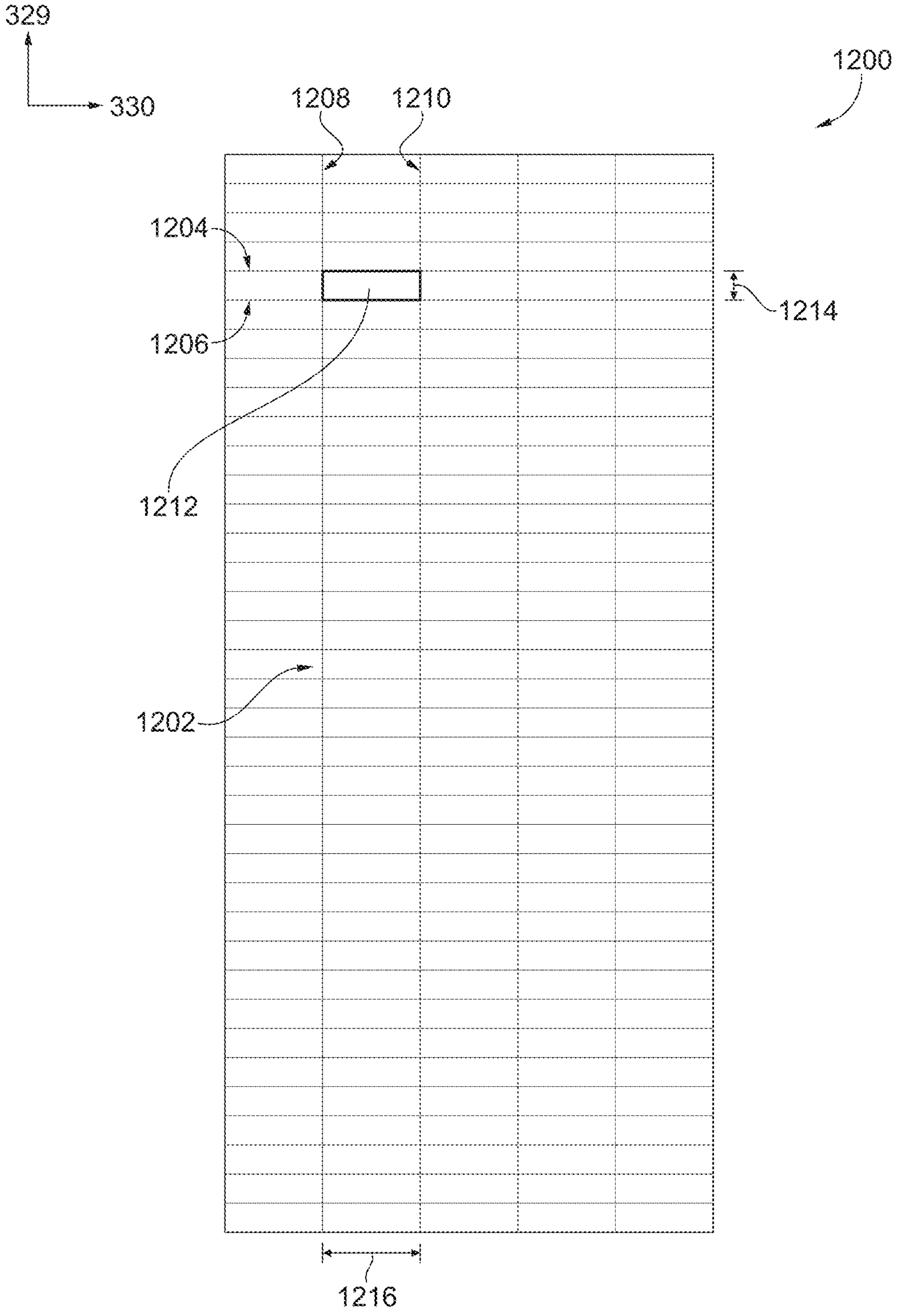
FIG. 12 depicts a scaled indicia for transverse shrinkage of a heat-shrink sheath, in accordance with aspects hereof.

FIG. 12 depicts a scaled printed indicia 1202 for transverse shrinkage of a heat-shrink sheath 1200. The indicia 1202 is for example purposes only and is not limiting. The indicia 1202 forms a rectangular pattern 1212 between a first indicia 1204, a second indicial 1206, a third indicia 1208, and a fourth indicia 1210. The rectangular pattern 1212 has a height 1214 in the longitudinal direction and a width 1216 in the transverse direction. In the presented pre-shrink configuration the rectangular pattern 1212, the height 1214 is less than the width 1216. However, following the shrink operation, the height 1214 is forecasted to change less than 10% whereas the width 1216 will change from 30 to 80%. As such, the indicia 1202 is scaled at printing to account for transverse shrinkage and relatively minimal longitudinal shrinkage. Further, the indicia 1202 may form the print layer 332 discussed hereinabove in the figures, such as FIG. 4. In that manner, the indicia 1202 is contemplated as being printed as a mirror image of the intended perceived indicia as it may be printed on an interior surface of a transparent sheath.

For a golf club specifically, it is contemplated that for a golf club driver, the transverse scaling of an indicia is done contemplating 30 to 60% shrinkage from the printed indicia and it is contemplated for a golf club non-driver with a sheath intended to pass over a grip the printed indicia will be scaled to shrink 50 to 80%. This prevents a distorted indicia that could otherwise distract or negatively impact the perceived quality of the sheath following a shrink operation.

Figure 13:
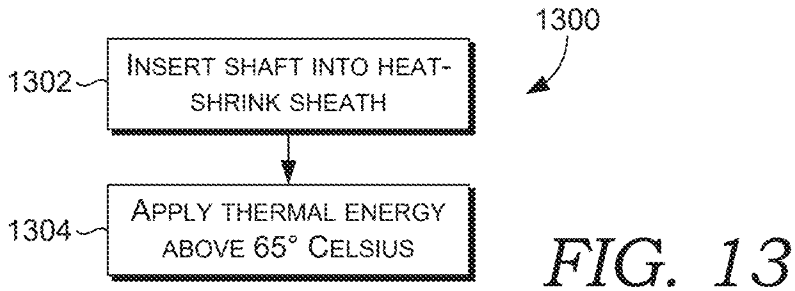
FIG. 13 depicts a method of applying a heat-shrink sheath to an athletic equipment shaft, in accordance with aspects hereof.

FIG. 13 depicts a method 1300 of applying a heat-shrink sheath to an athletic equipment shaft. At a block 1302 a shaft, such as an athletic equipment shaft, is inserted into a sheath, such as the sheath 300 provided herein, such as in FIG. 3. The insertion of the shaft into the sheath may occur such that the shaft has an additional component (e.g., a grip) attached thereto and the additional component passes through the sheath as part of the insertion. The insertion may be accomplished by pulling or otherwise sliding the sheath over the shaft.

The method 1300 continues at a block 1304 where thermal energy is applied to the sheath surrounding the shaft. The thermal energy applied is above 65 degrees C. In an example, the thermal energy applied is an air stream generated by a fan passing air over/through a thermal generator. A thermal generator may be an electrically resistive element, such as a heating coil or a heating strip. The thermal generator may rely on conduction, convection, or other thermal principals to elevate the temperature of objects/air from ambient conditions. In an example a traditional hair dryer is an example of a device effective for applying thermal energy to the sheath surrounding a shaft.

The application of thermal energy contemplated applying the thermal energy for 30 second to four minutes when the thermal energy is measured as air temperature above 65 degrees C. In another example, it is contemplated that applying the thermal energy for 30 second to 2 minutes when the thermal energy is measured as air temperature above 75 degrees C. In another example, it is contemplated that applying the thermal energy for 30 second to 90 seconds when the thermal energy is measured as air temperature above 80 degrees C. In another example, it is contemplated that applying the thermal energy for 15 second to 4 minutes when the thermal energy is measured as air temperature between 70 degrees C. and 100 degrees C. In another example, it is contemplated that applying the thermal energy when the thermal energy is measured as air temperature between 80 degrees C. and 95 degrees C.

Further yet, it is contemplated that a gradient temperature is leveraged to enhance a quality of the final sheath wrapping a shaft. For example, raising the air temperature surrounding the sheath that is wrapping a shaft over time assists in minimizing wrinkles and puckering that can occur with flash shrinking caused by an immersion of the sheath in an environment where the air temperature exceed 85 degrees C. This flash shrinking can cause non-uniform shrinking over time causing the sheath to wrinkle, rotate, and/or shift. Avoidance of these concerns can be achieved, in an example, with raising the temperature from 65 degrees C. to above 70 degrees C. over at least 30 seconds. This temperature rise of air surrounding the sheath allows the sheath to more uniformly shrink along a longitudinal length and minimizes unintended blemishes in the shrunk sheath.

In addition to applying thermal energy by way of surrounding air having an elevated temperature, it is contemplated that wet steam, water, and/or other fluids may be applied as stream, baths, and the like to cause the sheath to shrink while on a shaft. Excessive moisture, in some examples, may become trapped between the sheath and the shaft and adversely affect the shaft. For example, if the shaft is formed from metal susceptible to corrosion, trapped moisture may induce a corrosive result on the shaft. Therefore, moisture bearing thermal delivery means should be approached cautiously in situations where the shaft may be adversely impacted by prolonged exposure to moisture.

Figure 14:
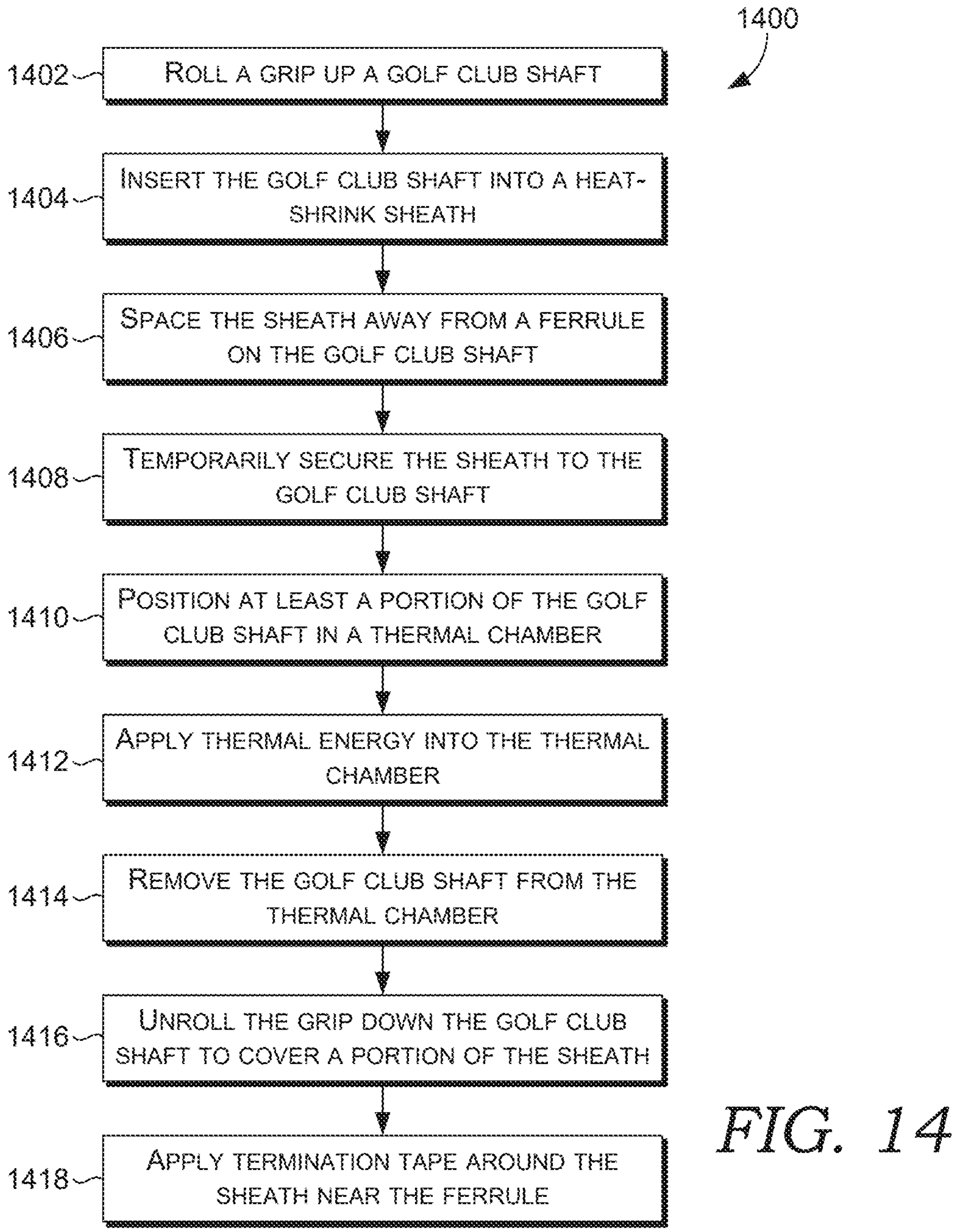
FIG. 14 depicts a method of applying a heat-shrink sheath to a golf club, in accordance with aspects hereof.
Figure 15:
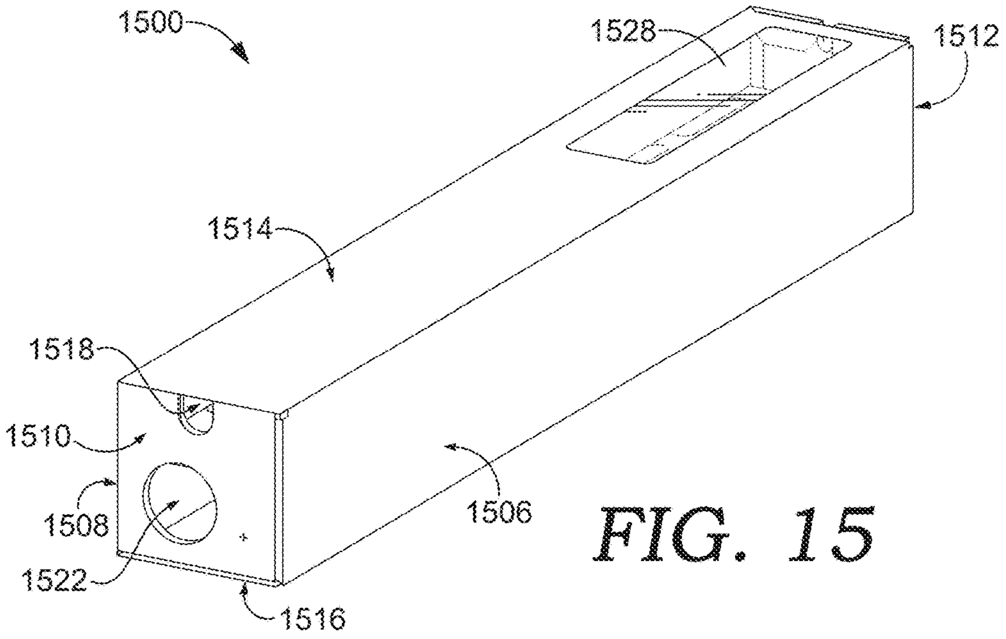
FIG. 15 depicts a first side perspective view of a thermal chamber, in accordance with aspects hereof.
Figure 16:
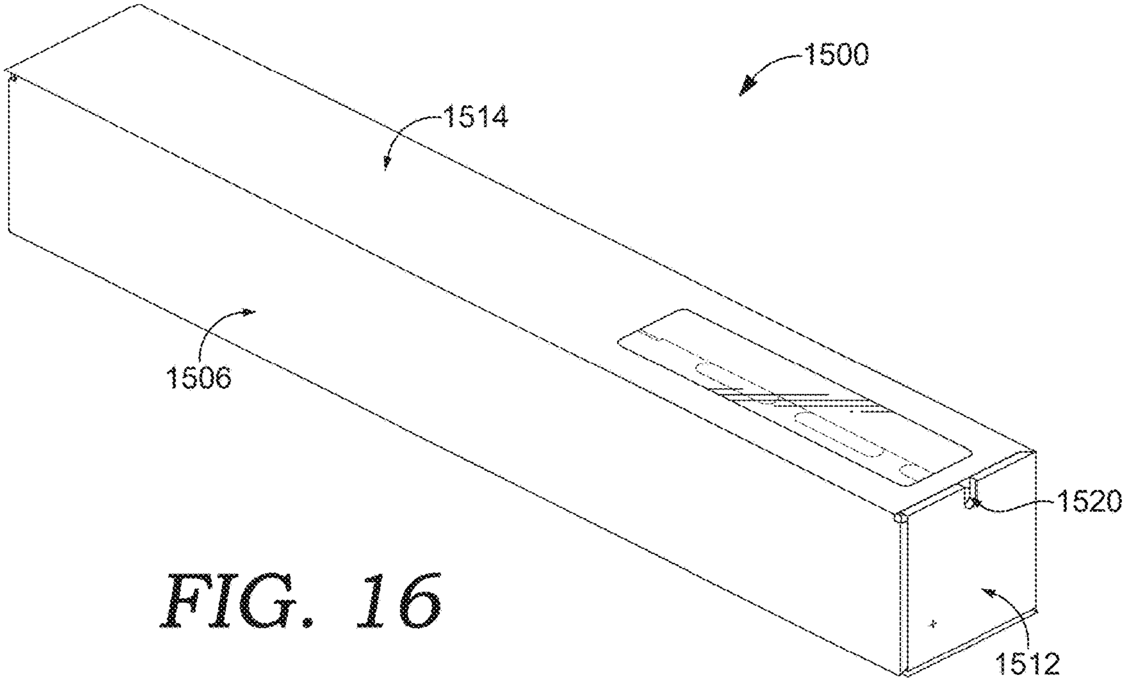
FIG. 16 depicts a second side perspective view of the thermal chamber from FIG. 15, in accordance with aspects hereof.
Figure 17:
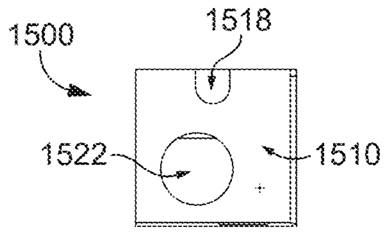
FIG. 17 depicts a first side view of the thermal chamber from FIG. 15, in accordance with aspects hereof.
Figure 18:
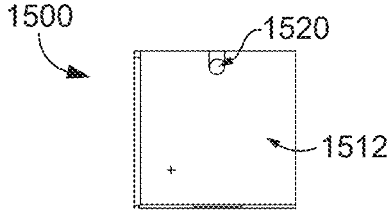
FIG. 18 depicts a second side view of the thermal chamber from FIG. 15, in accordance with aspects hereof.
Figure 19:
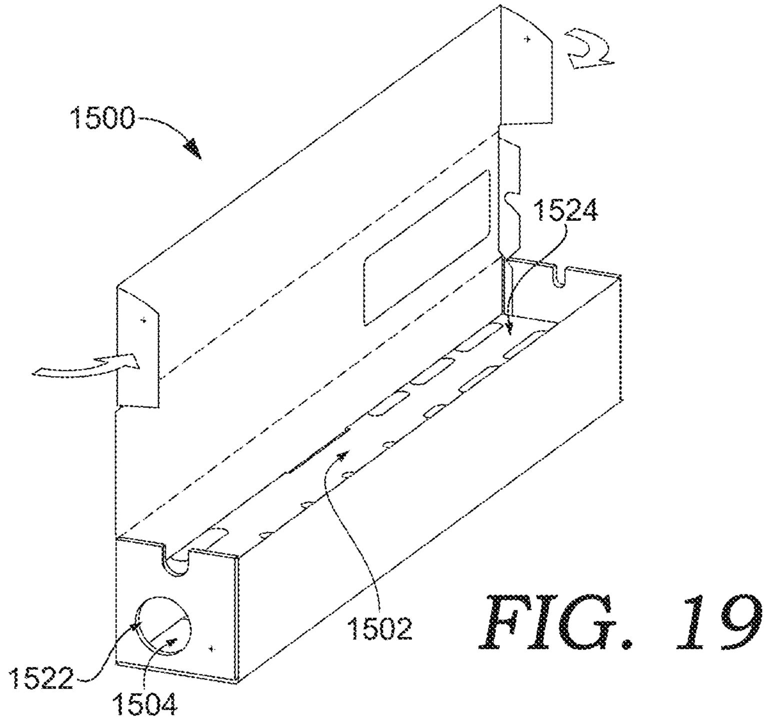
FIG. 19 depicts an open view of the thermal chamber from FIG. 15, in accordance with aspects hereof.

FIG. 14 depicts a method 1400 of applying a heat-shrink sheath to a golf club. At a block 1402 a grip on a golf club shaft is rolled up a first distance. The golf club grip can roll onto itself to expose a portion of the underlying golf club shaft traditional covered by the grip. The rolling process may be accomplished by engaging an inferior edge of the grip on the shaft and sliding the inferior edge over a superior portion of the grip to cause a rolling or overlapping of the grip proximate the inferior edge on a superior portion of the grip. Regardless of how the grip is turned back, a portion of the shaft traditionally covered by an inferior portion of the grip is now exposed and will serve as a termination location for the sheath following shrinking.

At a step 1404 a golf club shaft is inserted into the sheath, such as the sheath 300 of FIG. 3. The insertion of the shaft into the sheath may be accomplished by passing the sheath over the grip, passing the sheath over the grip end of the shaft after removing of the grip through the block 1402, or passing the sheath over the head end of the shaft after the removal of the golf club head (e.g., a driver head removable connected to a head end of the shaft).

At a block 1406 the sheath is optionally spaced away in the longitudinal direction from a ferrule (or the position where a ferrule should be located) on the golf club shaft. The spacing may be accomplished with a physical spacer block or gauge that ensures a consistent offset is achieved. The offset may be 0.1 mm to 15 mm from the position the head, the ferule, or the location for a ferrule to be placed. This 0.1-15 mm offset exposes the shaft at the narrowest portion of the shaft to be covered by the sheath. This is purposeful in this example as the sheath may expand in the longitudinal direction because of the significant constriction in the transverse direction at the head end of the shaft that requires the greatest amount of shrinkage along the shaft length. The offset provides a tolerance for the sheath to expand longitudinally without puckering or otherwise deforming from a collision with the ferrule or golf head. As will be discussed at a block 1418, a termination tape may be optionally applied to secure the sheath end closest to the ferrule and the cover, for protection of the underlying shaft, any remaining exposed shaft portion following the thermal energy application to the sheath. Stated differently, in an example the sheath does not extend over the ferrule or club head. However, in other examples, it is contemplated that the sheath extends over the ferrule and then a cut is made to the sheath following shrinkage to size the sheath longitudinally.

At a block 1408 the sheath is temporary secured to the shaft. This temporary securement may include a removable tape or sticker positioned on the sheath and an exposed portion of the shaft. The temporary securement may be from a placement tape. The temporary securement may be positioned near the grip end of the shaft at the transition from the sheath to the exposed shaft. The temporary securement may additionally or alternatively be positioned near the head end of the shaft at the transition from the sheath to the exposed shaft, ferrule, or head. The temporary securement is effective to maintain a position of the sheath along a longitudinal length of the shaft to maintain the offset from block 1406. The temporary securement is effective to maintain a rotational position of the sheath relative to the shaft. For example, the joint/seam and/or longitudinal perforation may be positioned on a backside hemisphere of the shaft and the temporary securement ensures the sheath does not material rotate relative to the shaft prior to shrinking into position.

In an example where forced air is leveraged to apply thermal energy, the temporary securement of the sheath to the shaft limits the movement of the sheath introduced by the passing of the forced air over the yet-to-be shrunk sheath. Further, it is contemplated that the temporary securement is positioned on the sheath and shaft at the grip end when the grip end is more proximate the source of the forced air relative to the head end. Further, the placement tape is effective to position and maintain the sheath at a longitudinal position (e.g., proximate the ferrule) during a shrinking operation.

At a block 1410 at least a portion of the shaft having the sheath thereon is positioned in a thermal chamber. In an example, the thermal chamber is comprised of a shaft chamber having a first support element, such as a first shaft slot, and a second support element, such as a second shaft slot, which are effective to suspend the portion of the shaft having the sheath thereon within the chamber. In this example, the grip may be positioned outside of the thermal chamber and the golf club head may be positioned outside of the thermal chamber. Having the grip and head outside of the thermal chamber reduces exposure of those components to the thermal energy being applied to the sheath. By limiting the exposure of the grip and head, the shrinking of the sheath to the shaft limits the effects of thermal energy on those components (e.g., softening an adhesive used in connection with the grip and/or golf club head or ferrule). The shaft may be positioned in the chamber with the joint and/or longitudinal perforation upward facing (e.g., on the top). The positioning of the joint and/or longitudinal perforation in the upward facing position allows for easy inspection of those feature before, during, and after the application of thermal energy.

At a block 1412 thermal energy is applied to the thermal chamber. Thermal energy application increases the ambient temperature to which the sheath is exposed within the thermal chamber. This may be accomplished through the introduction of forced air passing over a heating element, such as a stream of hot air emanating from a traditional hair dryer. As provided above, the application of thermal energy contemplates applying the thermal energy for 30 second to four minutes when the thermal energy is measured as air temperature above 65 degrees C. In another example, it is contemplated that applying the thermal energy for 30 second to 2 minutes when the thermal energy is measured as air temperature above 75 degrees C. In another example, it is contemplated that applying the thermal energy for 30 second to 90 seconds when the thermal energy is measured as air temperature above 80 degrees C. In another example, it is contemplated that applying the thermal energy for 15 second to 4 minutes when the thermal energy is measured as air temperature between 70 degrees C. and 100 degrees C. In another example, it is contemplated that applying the thermal energy when the thermal energy is measured as air temperature between 80 degrees C. and 95 degrees C.

In yet a different example, the thermal chamber is a fluid bath in which there is a fluid that is above 65 degrees C., or above 75 degrees C., or above 80 degrees C., or above 85 degrees C., or above 90 degrees C. The fluid may be water, oil, or other mediums acceptable for the applying sufficient thermal energy to the sheath to cause a shrinking effect effective to compress the sheath around the shaft.

In yet another example, the thermal chamber is a chamber having a steam port effective for disseminating water vapor steam at the sheath within the chamber. The steam port may be fluidly coupled with a boiler or other generator of water vapor steam.

At a step 1414 the golf club shaft is removed from the thermal chamber. The removal occurs once the sheath has sufficiently constricted around the shaft to form a protective covering with acceptable aesthetics. The removal may occur after the shaft, sheath, or ambient conditions of the thermal chamber have decreased from a temperature experienced during the shrining operation. This intentional delay in removing the shaft from the thermal chamber may allow for other features, such as a thermally activated glue used in connection with a grip, ferrule, and/or golf head to solidify, set, or otherwise transform from a temporary state introduced during the shrinking operation.

It is contemplated that any of steps 1404 through 1414 may be repeated to layer one sheath over another sheath. For example, steps 1404 through 1414 (less any optional steps omitted) may be performed with a first sheath, such as a solid white sheath. Then, following step 1414, the steps 1404 through 1414 (less any optional steps omitted) may be performed with a second sheath over the first sheath. This dual sheath concept may be used in situations where the second sheath has opaque, transparent, translucent portions that expose portions of the underlying article unintentionally. Therefore, the first sheath may provide a more uniform surface (e.g., a white sheath forms a white surface) onto which the second sheath may be applied. Further, it is contemplated that the first sheath may include elements provided herein (e.g., tactile elements, identifiers, RFID elements, and the like) and the second sheath protects or overlaps those elements applied via the first sheath.

Stated differently, it is contemplated that a first sheath is on an article and a second sheath overlays the first sheath on the article. The article has two or more sheaths, with the second sheath overlaps at least a portion of the first sheath.

At a block 1416 the grip is unrolled or otherwise pealed back to an intended configuration. This action obscured the grip end of the sheath under the grip and provides a clean transition from the protective covering without the use of termination tape at the grip end. The covering of the grip and of the sheath also prevents an unintended activation/tearing of a longitudinal perforation.

At a block 1418 an optional step of a termination tape is applied at a head end of the sheath near the ferrule or the golf club head. While optional, the termination tape accounts for a gap between the sheath and the ferrule/golf head following the shrink operation. Depending on shaft diameter, ambient conditions, material properties of the sheath, a portion of the shaft may remain exposed between the terminal end of the sheath and the ferrule/club head. Application of the termination tape over the exposed shaft portion and inclusion of the sheath in the coverage of the termination tape provides a protective layer to the exposed shaft portion and terminates the sheath to protect the sheath from ripping or otherwise catching. The termination tape may have a width (measured in the longitudinal direction of the shaft when applied) of 1 mm to 10 mm, in an example, the termination tape nay be and size in another example. The termination tape may be applied by wrapping the tape around the shaft and back onto the first applied portion of the termination tape. The termination tape may have an adhesive back effective to bond the termination tape with the exposed shaft portion and the head end of the sheath.

The steps of method 1400 are optional and may be performed in alternative orders from that which they are arranged in FIG. 14. Further it is understood that one or more additional steps may be inserted to the method 1400. Further, it is contemplated that one or more steps may be omitted from the method 1400, such as optional steps.

In an example, it is contemplated that two or more sheaths form a set of sheaths. The set of sheaths may include a first sheath having a first longitudinal length and a first circumference and a second sheath having a second longitudinal length and a second circumference. The first and second longitudinal lengths are different and the first and second circumferences are different. In a specific example, the set of sheaths includes a driver sheath and a non-driver sheath. A driver sheath has a longitudinal length between 850 mm and 950 mm and a circumference between 50 mm and 55 mm and a non-driver sheath has a longitudinal length between 725 mm and 825 mm and a circumference between 90 mm and 100 mm. Other combinations are contemplated, such that the set includes at least two times a number of a second sheath as compared to a first sheath to supply multiple shafts in an athletic equipment set, such as a golf club set.

FIGS. 15-19 depict a thermal chamber 1500, in accordance with aspects hereof. The thermal chamber 1500 is an effective tool for applying thermal energy to a sheath, such as the sheath 300 from FIG. 3. The thermal chamber 1500 may be formed from any material, such as a corrugated material. A corrugated material provides an advantage of thermally insulating the interior volume of the thermal chamber 1500 from exterior conditions and surfaces, which drives efficiency and safety. The corrugated material may be a polymer composition in an example. The corrugated material may be a cardboard or other organic composition (e.g., fiberboard) in another example.

A thermal chamber is formed from an enclosure capable of containing a portion of a shaft having a sheath thereon and for directing or containing thermal energy. For example, the enclosure may be a vessel capable of containing a fluid, such as water or oil, into which a shaft having a sheath is submerged to apply the thermal energy. The enclosure may be a chest for applying vapor steam to a shaft having a sheath thereon. The enclosure may be the thermal chamber 1500 depicted in FIGS. 15-18 that is effective for distributing forced air in an intentional manner to achieve a desired shrinkage along a longitudinal length of the shaft while minimizing the introduction of wrinkles and puckers resulting from uneven application of thermal energy to a sheath on a tapered shaft or any shaft.

A thermal chamber may be in any shape, such as a traditional cylinder extending between a first end and a second end. A thermal chamber may be a prism structure having at least five faces inclusive of a first end and a second end. A thermal chamber may be a rectangular prism having six rectangular faces inclusive of a first end and a second end, such as the thermal chamber 1500.

The thermal chamber 1500 is comprised of a shaft chamber portion 1502, an air distribution chamber portion 1504, a front 1506, a back 1508, a grip side 1510, a head side 1512, a lid 1514, a bottom 1516, a first shaft slot 1518, a second shaft slot 1520, an inlet aperture 1522, an air distribution panel 1524, a plurality of air distribution apertures 1526, and a viewing window 1528.

The lid 1514 is hingedly coupled with the back 1508 allowing the lid 1514 to be selectively opened to expose an internal volume of the thermal chamber 1500, such as the shaft chamber portion 1502. This hinged connection may be a living hinge, such as an intentional fold line in the material forming the thermal chamber 1500. The ability to open and close the lid 1514 allows for the insertion of a golf club into the shaft chamber portion 1502, closing the lid 1514 concentrates and maintains forced heated air within the thermal chamber 1500 to effectively shrink the sheath around the inserted golf club shaft.

The first shaft slot 1518 is formed in the grip side 1510 and the second shaft slot 1520 is formed in the head side 1512. The grip side 1510 also includes the inlet aperture 1522. The positioning of the first shaft slot 1518 and the second shaft slot 1520 relative to the inlet aperture 1522 is intentional. In an aspect, it is desired to have a slot adapted to receive a greater diameter of a grip end of the golf club shaft at the same side as the inlet aperture 1522. This is a result of the air flow achieved by the thermal chamber 1500 through the coordination of the air distribution panel 1524 and the plurality of air distribution apertures 1526 creates a hotter initial environment at the head side 1512. It is desired, in an example, for the smaller diameter of the golf club shaft to be positioned in the hotter portion of the thermal chamber 1500 as the sheath has a greater amount of shrinkage to achieve on the smaller diameter head end of a golf club shaft. As such the second shaft slot 1520 is sized with a smaller width than a width of the first shaft slot 1518. Stated differently, a slot at an end of the thermal chamber 1500 opposite the inlet aperture 1522 is configured to receive a tapered shaft portion requiring a greater amount of shrinkage than a slot at the opposite end of the tapered shaft.

The inlet aperture 1522 fluidly connects the air distribution chamber portion 1504 with an exterior of the thermal chamber. The air inlet aperture is configured to receive a forced air stream directly or indirectly. In a direct manner it is contemplated that an end of a traditional hair blow dryer is positioned in or near the inlet aperture 1522 to receive heated forced air from the hair driver. In that example, the air inlet aperture may be a circle having a diameter from 25 mm to 76 mm. The diameter may be flexibly adjusted to accommodate a variety of sizes of input nozzles, such as the working end of a blow dryer.

The air distribution panel 1524 serves as a barrier between the shaft chamber portion 1502 and the air distribution chamber portion 1504. The air distribution panel 1524 is comprised of the plurality of air distribution apertures 1526 that fluidly connect the shaft chamber portion 1502 with the air distribution chamber portion 1504.

The thermal chamber 1500 has a longitudinal length between 100 cm and 130 cm. This range of longitudinal length allows for a common thermal chamber to be effective for both of a golf club driver and a non-driver, which is generally shorter than a driver. The thermal chamber 1500 has a width between the front 1506 and the back 1508 between 10 cm and 20 cm. This range of width is effective for suitable air distribution while minimizing a volume of air to be heated to an effective temperature to shrink a sheath. Any size is contemplated and may be adjusted based on dimensions of the article to be heated and/or the dimensions of the sheath to be shrunk.

While many examples relate to sizes, shapes, and configurations capable of applying a sheath to a golf club shaft, it is contemplated that the sheath, the shaft, and the thermal chamber provided herein may be scaled to any size, shape, or configuration to be effective for use in connection with other shafts, such as athletic equipment shafts other than golf club shafts. The present disclosure is not intended to limit the scope of the present invention to a specific use condition, but instead the specific examples are provided to provide additional context and understanding of the larger concept captured in the present disclosure.

For example, a heat-shrink sheath provided herein is contemplated as being used as a protective sheath for a pole, such as a ski pole. In that example, the sheath may have a longitudinal length from about 80 cm to 150 cm and having a circumference of about 40 mm to 220 mm. In a ski pole example, it is contemplated that one or more of the grips and/or the basket are removed for applying the sheath over the shaft. However, the sheath may, alternatively, be applied by passing the sheath over a grip. In this example, the process for applying a sheath to the pole, such as a ski pole, remains consistent. It is contemplated that termination tape may be applied near the basket and/or near the handle. It is also contemplated that the sheath extends to the basket such that the basket overlaps a portion of the sheath obviating the use of termination tape. Similarly, it is contemplated that the grip may extend over apportion of the sheath obviating the use of transfer tape proximate the grip.

EXAMPLE CLAUSES

The following clauses represent example embodiments of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Example Clause A: A golf club shaft sheath may include: a base sheet having an interior surface overlapping and joined with an exterior surface forming a cylindrical structure having a longitudinal length and an interior surface circumference measured orthogonal to the longitudinal length, where the base sheet is formed from a thermoplastic composition; the base sheet having a thickness between the interior surface and the exterior surface of 35 microns to 60 microns; and a print layer, the print layer formed on at least one of the interior surfaces or the exterior surface of the base sheet.

Example Clause B: The sheath of Example Clause A, where the base sheet is a transparent or semi-transparent material.

Example Clause C: The sheath of Example Clause A or Example Clause B, where the base sheet has a haze percentage between 1% and 7% measured according to ASTM D1003-21.

Example Clause D: The sheath of any one of Example Clauses A-C, where the interior surface and the exterior surface are joined by a solvent-generated weld.

Example Clause E: The sheath of any one of Example Clauses A-D, where the interior surface and the exterior surface overlap 10 mm to 1 mm.

Example Clause F: The sheath of any one of Example Clauses A-E, where the cylindrical structure is a non-circular in a cross section.

Example Clause G: The sheath of any one of Example Clauses A-F, where the cylindrical structure is a planar sheath capable of surrounding a shaft.

Example Clause H: The sheath of any one of Example Clauses A-G, where the longitudinal length is between 400 mm and 1,200 mm.

Example Clause I: The sheath of any one of Example Clauses A-H, where the longitudinal length is between 600 mm and 1,100 mm.

Example Clause J: The sheath of any one of Example Clauses A-I, where the longitudinal length is between 800 mm and 1,000 mm.

Example Clause K: The sheath of any one of Example Clauses A-J, where the longitudinal length is between 850 mm and 950 mm.

Example Clause L: The sheath of any one of Example Clauses A-K, where the longitudinal length is between 725 mm and 825 mm.

Example Clause M: The sheath of any one of Example Clauses A-L, where a circumference is a measurement around a surface regardless of the surface shape.

Example Clause N: The sheath of any one of Example Clauses A-M, where the surface shape is a substantially planar sheath structure capable of opening to envelop a shaft.

Example Clause O: The sheath of any one of Example Clauses A-N, where the circumference is between 30 mm and 170 mm.

Example Clause P: The sheath of any one of Example Clauses A-O, where the circumference is between 47 mm and 57 mm.

Example Clause Q: The sheath of any one of Example Clauses A-P, where the circumference is between 90 mm and 100 mm.

Example Clause R: The sheath of any one of Example Clauses A-Q, where the circumference is between 75 mm and 90 mm.

Example Clause S: The sheath of any one of Example Clauses A-R, where the circumference is between 80 mm and 85 mm.

Example Clause T: The sheath of any one of Example Clauses A-S, where the circumference is between 50 mm and 55 mm.

Example Clause U: The sheath of any one of Example Clauses A-T, where the longitudinal length is between 850 mm and 950 mm and the circumference is between 50 mm and 55 mm.

Example Clause V: The sheath of any one of Example Clauses A-U, where the longitudinal length is between 725 mm and 825 mm and the circumference is between 90 mm and 100 mm.

Example Clause W: The sheath of any one of Example Clauses A-V, where the circumference is may include along the longitudinal length.

Example Clause X: The sheath of any one of Example Clauses A-W, where the thermoplastic composition may include at least one selected from: a polyester-based composition, a polystyrene-based composition, a polyvinyl chloride-based composition, a polyolefin-based composition, a polyamide composition, an aramid composition, a polyimide composition, a polyphenylene sulfide composition, or an acrylic-based composition.

Example Clause Y: The sheath of any one of Example Clauses A-X, where the thermoplastic composition may include polyethylene terephthalate.

Example Clause Z: The sheath of any one of Example Clauses A-Y, where the thermoplastic polyester composition may include polyethylene terephthalate glycol.

Example Clause AA: The sheath of any one of Example Clauses A-Z, where the base sheet has a first longitudinal edge and an opposite second longitudinal edge, where the first longitudinal edge and the second longitudinal edge define an overlap portion where the interior surface and the exterior surface are joined.

Example Clause AB: The sheath of any one of Example Clauses A-AA, where the overlap portion is 1 mm to 10 mm measured between the first longitudinal edge and the second longitudinal edge transverse to the longitudinal length.

Example Clause AC: The sheath of any one of Example Clauses A-AB, where the overlap portion is 2 mm to 8 mm measured between the first longitudinal edge and the second longitudinal edge transverse to the longitudinal length.

Example Clause AD: The sheath of any one of Example Clauses A-AC, where the overlap portion is 3 mm to 7 mm measured between the first longitudinal edge and the second longitudinal edge transverse to the longitudinal length.

Example Clause AE: The sheath of any one of Example Clauses A-AD, where the second longitudinal edge is more exterior to the cylindrical structure than the first longitudinal edge and where a weld joint joins the interior surface and the exterior surface and the weld joint extends between a first weld edge and a second weld edge, the second weld edge is more proximate the second longitudinal edge than the first weld edge.

Example Clause AF: The sheath of any one of Example Clauses A-AE, where the second weld edge is at the second longitudinal edge.

Example Clause AG: The sheath of any one of Example Clauses A-AF, where the second weld edge is offset from the second longitudinal edge between 0 mm and 1 mm.

Example Clause AH: The sheath of any one of Example Clauses A-AG, where the second weld edge is offset from the second longitudinal edge between 0 mm and 2 mm.

Example Clause AI: The sheath of any one of Example Clauses A-AH, where the second weld edge is offset from the second longitudinal edge between 0 mm and 5 mm.

Example Clause AJ: The sheath of any one of Example Clauses A-AI, where the thermoplastic composition is a heat-shrink material.

Example Clause AK: The sheath of any one of Example Clauses A-AJ, where the thermoplastic composition is a heat shrink material capable of shrinking 60% to 80% in a transverse direction to the longitudinal length measured according to ASTM D1204-14 at 90 degrees Celsius for 10 seconds in water.

Example Clause AL: The sheath of any one of Example Clauses A-AK, where the thermoplastic composition shrinks less than 10% in a transverse direction to the longitudinal length below 60 degrees Celsius and shrinks between 11% and 80% between 65 degrees Celsius and 100 degrees Celsius measured according to ASTM D1204-14.

Example Clause AM: The sheath of any one of Example Clauses A-AL, where the thermoplastic composition has a tensile strength of 200-300 Mpa in a transverse direction and 30-80 Mpa in a longitudinal direction measured according to ASTM D882-18 with v=100 mm/min.

Example Clause AN: The sheath of any one of Example Clauses A-AM, where the thickness is 45 microns to 50 microns measured according to ASTM D374-99.

Example Clause AO: The sheath of any one of Example Clauses A-AN, where the print layer is formed on the interior surface.

Example Clause AP: The sheath of any one of Example Clauses A-AO, where the print layer is omitted from the interior surface at a portion of the interior surface overlapping the exterior surface.

Example Clause AQ: The sheath of any one of Example Clauses A-AP, where the print layer terminate within 1 mm to 10 mm of a first longitudinal edge or within 1 mm to 10 mm of a second longitudinal edge.

Example Clause AR: The sheath of any one of Example Clauses A-AQ, where the print layer terminate within 4 mm to 6 mm of a first longitudinal edge or within 1 mm to 10 mm of a second longitudinal edge.

Example Clause AS: The sheath of any one of Example Clauses A-AR, where the print layer includes a first portion forming a first indicia and a second portion forming a second indicia, where the second portion is 1% to 20% of the longitudinal length and the first portion is at least 79% of the longitudinal length.

Example Clause AT: The sheath of any one of Example Clauses A-AS, where the print layer extends a first distance in the transverse direction that is between 1 mm and 10 mm less than the circumference.

Example Clause AU: The sheath of any one of Example Clauses A-AT, where the print layer extends a first distance in the transverse direction that is between 4 mm and 6 mm less than the circumference.

Example Clause AV: The sheath of any one of Example Clauses A-AU further may include a perforation extending in a longitudinal direction.

Example Clause AW: The sheath of any one of Example Clauses A-AV, where the perforation is parallel to at least one of a first longitudinal edge or the second longitudinal edge.

Example Clause AX: The sheath of any one of Example Clauses A-AW, where the perforation extends at least 75% of the longitudinal length.

Example Clause AY: The sheath of any one of Example Clauses A-AX, where the perforation extends the longitudinal length.

Example Clause AZ: The sheath of any one of Example Clauses A-AY, where the perforation is offset from one of a first longitudinal edge or a second longitudinal edge by a distance less than 45% of the circumference.

Example Clause AAA: The sheath of any one of Example Clauses A-AZ, where the perforation is offset from one of a first longitudinal edge or a second longitudinal edge by a distance less than 10 mm.

Example Clause AAB: The sheath of any one of Example Clauses A-AAA, where the perforation extends through the print layer.

Example Clause AAC: The sheath of any one of Example Clauses A-AAB, where the print layer terminates between the perforation and a weld joint.

Example Clause AAD: The sheath of any one of Example Clauses A-AAC, where the print layer extends between the (1) perforation and (2) whichever of a first longitudinal edge or a second longitudinal edge that is more proximate to the perforation.

Example Clause AAE: The sheath of any one of Example Clauses A-AAD, where the perforation is may include of 10 to 50 ties per inch (TPI).

Example Clause AAF: The sheath of any one of Example Clauses A-AAE, where the perforation is may include of 15 to 40 ties per inch (TPI).

Example Clause AAG: The sheath of any one of Example Clauses A-AAF, where the perforation is may include of 20 to 30 ties per inch (TPI).

Example Clause AAH: The sheath of any one of Example Clauses A-AAG, where the print layer may include an indicia scaled to shrink between 65% and 75% in the transverse direction and the indicia is scaled to shrink less than 5% in the longitudinal direction.

Example Clause AAI: The sheath of any one of Example Clauses A-AAH, where the print layer may include an indicia scaled to shrink between 40% and 50% in the transverse direction and the indicia is scaled to shrink less than 5% in the longitudinal direction.

Example Clause AAJ: The sheath of any one of Example Clauses A-AAI further may include a first perforation in the transverse direction.

Example Clause AAK: The sheath of any one of Example Clauses A-AAJ, further may include a second perforation in the transverse direction, where the first perforation and the second perforation are separated by a distance measured in a longitudinal direction.

Example Clause AAL: The sheath of any one of Example Clauses A-AAK, where the distance is between 700 mm and 1,000 mm.

Example Clause AAM: The sheath of any one of Example Clauses A-AAL, where the distance is between 725 mm and 825 mm or 850 mm and 950 mm.

Example Clause AAN: A shaft sheath may include: a base sheet having a first longitudinal edge, a second longitudinal edge offset from the first longitudinal edge in a transverse direction, an interior surface, and an exterior surface, where the interior surface overlaps and is bonded with the exterior surface forming an enclosed structure in the transverse direction and an open structure in a longitudinal direction, where the enclosed structure has a longitudinal length and an interior surface circumference measured in the transverse direction, where the base sheet is formed from thermoplastic composition; and a print layer, the print layer formed on the interior surface of the base sheet and may include an indicia that is scaled to shrink 30% to 80% in the transverse direction and scaled to shrink less than 10% in the longitudinal direction.

Example Clause AAO: The sheath of Example Clause AAN, where the shaft is a portion of at least one selected from a hockey stick, a ski pole, a golf hole flag shaft, a fishing pole, a lacrosse stick, a field hockey stick, a golf club, a trekking pole, a pole vault pole, a baseball bat, a softball bat, or a cricket bat.

Example Clause AAP: The sheath of Example Clause AAN or Example Clause AAO, where the base sheet is a transparent or semi-transparent material.

Example Clause AAQ: The sheath of any one of Example Clauses AAN-AAP, where the base sheet has a haze percentage between 1% and 7% measured according to ASTM D1003-21.

Example Clause AAR: The sheath of any one of Example Clauses AAN-AAQ, where the interior surface and the exterior surface are joined by a solvent-generated weld.

Example Clause AAS: The sheath of any one of Example Clauses AAN-AAR, where the interior surface and the exterior surface overlap 10 mm to 1 mm.

Example Clause AAT: The sheath of any one of Example Clauses AAN-AAS, where the cylindrical structure is a non-circular in a cross section.

Example Clause AAU: The sheath of any one of Example Clauses AAN-AAT, where the cylindrical structure is a planar sheath capable of surrounding a shaft.

Example Clause AAV: The sheath of any one of Example Clauses AAN-AAU, where the longitudinal length is between 400 mm and 1,200 mm.

Example Clause AAW: The sheath of any one of Example Clauses AAN-AAV, where the longitudinal length is between 600 mm and 1,100 mm.

Example Clause AAX: The sheath of any one of Example Clauses AAN-AAW, where the longitudinal length is between 800 mm and 1,000 mm.

Example Clause AAY: The sheath of any one of Example Clauses AAN-AAX, where the longitudinal length is between 850 mm and 950 mm.

Example Clause AAZ: The sheath of any one of Example Clauses AAN-AAY, where the longitudinal length is between 725 mm and 825 mm.

Example Clause AAAA: The sheath of any one of Example Clauses AAN-AAZ, where a circumference is a measurement around a surface regardless of the surface shape.

Example Clause AAAB: The sheath of any one of Example Clauses AAN-AAAA, where the surface shape is a substantially planar sheath structure capable of opening to envelop a shaft.

Example Clause AAAC: The sheath of any one of Example Clauses AAN-AAAB, where the circumference is between 30 mm and 170 mm.

Example Clause AAAD: The sheath of any one of Example Clauses AAN-AAAC, where the circumference is between 47 mm and 57 mm.

Example Clause AAAE: The sheath of any one of Example Clauses AAN-AAAD, where the circumference is between 90 mm and 100 mm.

Example Clause AAAF: The sheath of any one of Example Clauses AAN-AAAE, where the circumference is between 75 mm and 90 mm.

Example Clause AAAG: The sheath of any one of Example Clauses AAN-AAAF, where the circumference is between 80 mm and 85 mm.

Example Clause AAAH: The sheath of any one of Example Clauses AAN-AAAG, where the circumference is between 50 mm and 55 mm.

Example Clause AAAI: The sheath of any one of Example Clauses AAN-AAAH, where the longitudinal length is between 850 mm and 950 mm and the circumference is between 50 mm and 55 mm.

Example Clause AAAJ: The sheath of any one of Example Clauses AAN-AAAI, where the longitudinal length is between 725 mm and 825 mm and the circumference is between 90 mm and 100 mm.

Example Clause AAAK: The sheath of any one of Example Clauses AAN-AAAJ, where the circumference is may include along the longitudinal length.

Example Clause AAAL: The sheath of any one of Example Clauses AAN-AAAK, where the thermoplastic composition may include at least one selected from: a polyester-based composition, a polystyrene-based composition, a polyvinyl chloride-based composition, a polyolefin-based composition, a polyamide composition, an aramid composition, a polyimide composition, a polyphenylene sulfide composition, or an acrylic-based composition.

Example Clause AAAM: The sheath of any one of Example Clauses AAN-AAAL, where the thermoplastic composition may include polyethylene terephthalate.

Example Clause AAAN: The sheath of any one of Example Clauses AAN-AAAM, where the thermoplastic polyester composition may include polyethylene terephthalate glycol.

Example Clause AAAO: The sheath of any one of Example Clauses AAN-AAAN, where the base sheet has a first longitudinal edge and an opposite second longitudinal edge, where the first longitudinal edge and the second longitudinal edge define an overlap portion where the interior surface and the exterior surface are joined.

Example Clause AAAP: The sheath of any one of Example Clauses AAN-AAAO, where the overlap portion is 1 mm to 10 mm measured between the first longitudinal edge and the second longitudinal edge transverse to the longitudinal length.

Example Clause AAAQ: The sheath of any one of Example Clauses AAN-AAAP, where the overlap portion is 2 mm to 8 mm measured between the first longitudinal edge and the second longitudinal edge transverse to the longitudinal length.

Example Clause AAAR: The sheath of any one of Example Clauses AAN-AAAQ, where the overlap portion is 3 mm to 7 mm measured between the first longitudinal edge and the second longitudinal edge transverse to the longitudinal length.

Example Clause AAAS: The sheath of any one of Example Clauses AAN-AAAR, where the second longitudinal edge is more exterior to the cylindrical structure than the first longitudinal edge and where a weld joint joins the interior surface and the exterior surface and the weld joint extends between a first weld edge and a second weld edge, the second weld edge is more proximate the second longitudinal edge than the first weld edge.

Example Clause AAAT: The sheath of any one of Example Clauses AAN-AAAS, where the second weld edge is at the second longitudinal edge.

Example Clause AAAU: The sheath of any one of Example Clauses AAN-AAAT, where the second weld edge is offset from the second longitudinal edge between 0 mm and 1 mm.

Example Clause AAAV: The sheath of any one of Example Clauses AAN-AAAU, where the second weld edge is offset from the second longitudinal edge between 0 mm and 2 mm.

Example Clause AAAW: The sheath of any one of Example Clauses AAN-AAAV, where the second weld edge is offset from the second longitudinal edge between 0 mm and 5 mm.

Example Clause AAAX: The sheath of any one of Example Clauses AAN-AAAW, where the thermoplastic composition is a heat shrink material.

Example Clause AAAY: The sheath of any one of Example Clauses AAN-AAAX, where the thermoplastic composition is a heat shrink material capable of shrinking 60% to 80% in a transverse direction to the longitudinal length measured according to ASTM D1204-14 at 90 degrees Celsius for 10 seconds in water.

Example Clause AAAZ: The sheath of any one of Example Clauses AAN-AAAY, where the thermoplastic composition shrinks less than 10% in a transverse direction to the longitudinal length below 60 degrees Celsius and shrinks between 11% and 80% between 65 degrees Celsius and 100 degree As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

It should be noted that some of the terms used herein may be relative terms. For example, the terms "upper" and "lower" and the terms "forward" (or "front") and "rearward" (or "back") are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e., ground level. However, these terms should not be construed to require structures to be absolutely parallel or absolutely perpendicular to each other. For example, a first vertical structure and a second vertical structure are not necessarily parallel to each other. The terms "top" and "bottom" are used to refer to surfaces where the top is always higher than the bottom relative to an absolute reference, i.e., the surface of the earth when the component is used as intended. The terms "upwards" or "upwardly" and "downwards" or "downwardly" are also relative to an absolute reference; upwards is always against the gravity of the earth. The terms "forward" and "rearward" or "rear" with respect to a position or orientation are opposite one another along a common direction, and an "intermediate" position is always located between a forward position and a rearward position.

The terms "operative to" and "configured to" and similar terms are used herein to describe that a particular component has certain structural features designed to perform a designated function. Such components should be construed as having the expressed structure, with the designated function being considered part of the structure. The term "engage," and similar terms are used herein to describe the interaction between particular components and does not necessarily require that such components contact one another (directly or indirectly).

Unless indicated otherwise, all measurements provided herein are taken when component(s) is at standard ambient temperature and pressure (298.15 K and 100 kPa). As used herein, the terms "substantially" and "about" mean within +5% of an indicated value unless provided to the contrary.

The term "proximate" refers to a location that is near but not required to be at or on a location. Instead, the term proximate takes into consideration intervening structures, components, and the like that prevent a location to overlap, but takes into consideration an equivalent.

This detailed description is provided in order to meet statutory requirements. However, this description is not intended to limit the scope of the invention described herein. Rather, the claimed subject matter may be embodied in different ways, to include different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. A golf club shaft sheath comprising:

a base sheet having an interior surface overlapping and joined with an exterior surface forming a sheath structure having a longitudinal length and an interior surface circumference measured orthogonal to the longitudinal length, wherein the base sheet is formed from a heat-shrink thermoplastic composition comprising polyethylene terephthalate glycol;

a print layer, the print layer formed on the interior surface of the base sheet; and a perforation extending along at least a portion of the longitudinal length.

2. The sheath of claim 1, wherein the interior surface and the exterior surface overlap 10 mm to 1 mm.

3. The sheath of claim 1, wherein the longitudinal length is between 400 mm and 1,200 mm.

4. The sheath of claim 1, wherein the circumference is between: 47 mm and 100 mm, 47 mm and 57 mm, or 90 mm and 100 mm.

5. The sheath of claim 1, wherein the longitudinal length is between 850 mm and 950 mm and the circumference is between 47 mm and 57 mm.

6. The sheath of claim 1, wherein the longitudinal length is between 725 mm and 825 mm and the circumference is between 90 mm and 100 mm.

7. The sheath of claim 1, wherein the base sheet has a first longitudinal edge and an opposite second longitudinal edge, wherein the first longitudinal edge and the second longitudinal edge define an overlap portion where the interior surface and the exterior surface are joined and the overlap portion is 1 mm to 10 mm measured between the first longitudinal edge and the second longitudinal edge transverse to the longitudinal length.

8. The sheath of claim 1, wherein the thermoplastic composition is capable of shrinking 60% to 80% in a transverse direction measured according to ASTM D1204-14 at 90 degrees Celsius for 10 seconds in water.

9. The sheath of claim 1, wherein the thermoplastic composition shrinks less than 10% in a transverse direction below 60 degrees Celsius and shrinks between 11% and 80% between 65 degrees Celsius and 100 degrees Celsius measured according to ASTM D1204-14.

10. The sheath of claim 1, wherein the thermoplastic composition has a tensile strength of 200-300 Mpa in a transverse direction and 30-80 Mpa in a longitudinal direction measured according to ASTM D882-18 with v=100 mm/min.

11. The sheath of claim 1, wherein the base sheet has a haze percentage between 1% and 7% measured according to ASTM D1003-21.

12. The sheath of claim 1, wherein the interior surface and the exterior surface are joined by a solvent-generated weld.

13. The sheath of claim 1, wherein the print layer is omitted from the interior surface at a portion of the interior surface overlapping the exterior surface.

14. The sheath of claim 1, wherein the print layer terminate within 1 mm to 10 mm of a first longitudinal edge or within 1 mm to 10 mm of a second longitudinal edge.

15. The sheath of claim 1, wherein the print layer includes a first portion forming a first indicia and a second portion forming a second indicia, wherein the second portion is 1% to 20% of the longitudinal length and the first portion is at least 79% of the longitudinal length.

16. The sheath of claim 1, wherein the perforation is parallel to at least one of a first longitudinal edge or a second longitudinal edge.

17. The sheath of claim 1, wherein the perforation is comprised of 20 to 30 ties per inch (TPI).

18. A golf club comprising:
- a shaft;
- a grip overlapping a first portion of the shaft at a first end of the shaft;
- a club head extending from the shaft at a second end of the shaft;
- a sheath overlapping a second portion of the shaft between the grip and the club head, wherein the sheath comprises:
  - a base sheet having an interior surface overlapping and joined with an exterior surface forming a cylindrical structure around the shaft and having a longitudinal length, wherein the base sheet is formed from thermoplastic composition,
  - wherein the base sheet having a first thickness between the interior surface measured at a first location along the longitudinal length and a second thickness at a second location along the longitudinal length, wherein the second location is more proximate the club head than the first location, wherein the first thickness is less than the second thickness; and
  - a print layer, the print layer on the interior surface of the base sheet, wherein the print layer is omitted from the interior surface at a portion of the interior surface overlapping the exterior surface.

19. An athletic equipment shaft sheath comprising:
- a base sheet having a first longitudinal edge, a second longitudinal edge offset from the first longitudinal edge in a transverse direction, an interior surface, and an exterior surface, wherein the interior surface overlaps and is bonded with the exterior surface forming an enclosed structure in the transverse direction and an open structure in a longitudinal direction, wherein the enclosed structure has a longitudinal length and an interior surface circumference measured in the transverse direction, wherein the base sheet is formed from thermoplastic composition; and
- a print layer, the print layer formed on the interior surface of the base sheet and comprising an indicia that is scaled to shrink 30% to 80% in the transverse direction and scaled to shrink less than 10% in the longitudinal direction.

20. The sheath of claim 19, wherein the athletic equipment shaft is a portion of at least one selected from a hockey stick, a ski pole, a golf hole flag shaft, a fishing pole, a lacrosse stick, a field hockey stick, a golf club, a trekking pole, a pole vault pole, a baseball bat, a softball bat, or a cricket bat.

* * * * *